US007870289B2

(12) United States Patent  
Iwata

(10) Patent No.: US 7,870,289 B2  
(45) Date of Patent: Jan. 11, 2011

(54) INTERDOMAIN ROUTING SYSTEM

(75) Inventor: Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 1275 days.

(21) Appl. No.: 11/273,300

(22) Filed: Nov. 15, 2005

(65) Prior Publication Data

US 2006/0075136 A1   Apr. 6, 2006

Related U.S. Application Data

(62) Division of application No. 09/981,138, filed on Oct. 16, 2001, now Pat. No. 6,993,593.

(30) Foreign Application Priority Data

Oct. 18, 2000   (JP)   ............................. 2000/317984

(51) Int. Cl.  
*G06F 15/16* (2006.01)
(52) U.S. Cl. ........................ 709/238; 370/351
(58) Field of Classification Search .................. 709/238  
See application file for complete search history.

(56) References Cited

U.S. PATENT DOCUMENTS

| | | | | |
|---|---|---|---|---|
| 5,398,012 | A * | 3/1995 | Derby et al. ................. | 370/238 |
| 5,491,690 | A * | 2/1996 | Alfonsi et al. ............... | 370/404 |
| 5,497,368 | A * | 3/1996 | Reijnierse et al. ........... | 370/351 |
| 5,719,899 | A * | 2/1998 | Thielecke et al. ........... | 375/144 |
| 6,760,314 | B1 * | 7/2004 | Iwata .......................... | 370/254 |
| 6,829,654 | B1 * | 12/2004 | Jungck ......................... | 709/246 |
| 6,862,622 | B2 * | 3/2005 | Jorgensen .................... | 709/226 |
| 6,873,616 | B1 * | 3/2005 | Fedyk et al. ................. | 370/357 |
| 6,944,675 | B2 * | 9/2005 | Fujita .......................... | 709/240 |
| 6,993,593 | B2 * | 1/2006 | Iwata .......................... | 709/238 |
| 7,007,102 | B2 * | 2/2006 | Billhartz et al. ............. | 709/238 |
| 7,599,349 | B2 * | 10/2009 | Vasseur et al. .............. | 370/351 |
| 2003/0105865 | A1 * | 6/2003 | McCanne et al. ........... | 709/225 |
| 2003/0227901 | A1 * | 12/2003 | Kodialam et al. ........... | 370/351 |

FOREIGN PATENT DOCUMENTS

CA   2191945   6/1997

(Continued)

OTHER PUBLICATIONS

Varadhan, K. et al., "RFC1745—BGP4/IDRP for IP—OSPF Interaction" [online], Dec. 1994 [retrieved on Feb. 23, 2009], Network Working Group Request for Comment <http://www.faqs.org/rfcs/rfc1745.html>, p. 1-14.*

(Continued)

*Primary Examiner*—Bunjob Jaroenchonwanit  
(74) *Attorney, Agent, or Firm*—Dickstein Shapiro LLP

(57) ABSTRACT

In an interdomain network path control, by making path information with a network resource in a destination domain accessible in addition to path information with transmission domain and interdomain network resources, path selection taking network resources into consideration end to end is enabled and optimum path selection not only in a transmission direction but also in a reception direction is also enabled. Moreover, by making not only network resources but also processing load information of a service node accessible, selection of an optimum server and optimum path selection for the server are enabled using both the service node processing load information and the network resources.

6 Claims, 16 Drawing Sheets

FOREIGN PATENT DOCUMENTS

JP 06-276196 9/1994

OTHER PUBLICATIONS

Moy, J., "OSPF Version 2" [online], Apr. 1998 [retrieved Apr. 2010], Network Working Group Request for Comments: 2328, pp. 1-244 <http://www.faqs.org/ftp/rfc/pdf/rfc2328.txt.pdf>.*

Rekhter et al., "A Border Gateway Protocol 4 (BGP-4)" [online], Mar. 1995 [retrieved Apr. 2010], Network Working Group Request for Comments: 1771, pp. 1-57 <http://www.faqs.org/ftp/rfc/pdf/rfc1771.txt.pdf>.*

Tsukasa Ogina et al., "An Examination of the Optimal Server Search System in a Wide Range Dispersion Arrangement Web Server," Information Processing Society of Japan research report, Jul. 11, 2000 (with English abstract).

B. Abarbanel, "BGP-4 Support for Traffic Engineering", Network Working Group, IPOptical, Inc., Senthil Venkatachalam, Alcatel, U.S.A., Jul. 13, 2001, pp. 1-12.

K. Delgadillo, "Cisco DistributedDirector", Cisco Systems, Inc., 1999, pp. 1-19.

* cited by examiner

INTERDOMAIN ROUTING SYSTEM

This is a divisional of application Ser. No. 09/981,138, filed Oct. 16, 2001, which is hereby incorporated herein by reference.

BACKGROUND OF THE INVENTION

1. Field of the Invention

The present invention relates to an interdomain routing system and, more particularly, to a routing system (device) enabling path selection taking network resources into consideration end to end by using, at a node in a certain domain, path information in other domain to which no routing information is notified.

2. Description of the Related Art

One example of an interdomain QoS routing system as a conventional interdomain routing system is recited in the proposal by B. Abarbanel, entitled "BGP-4 Support for Traffic Engineering", pages 1 through 13 of draft-abarbanel-idr-bgp4-te-01.txt which was issued as an Internet draft of IETF in 2000.

The conventional interdomain QoS routing system is a system (BGP-TE system) which realizes routing in consideration of load distribution or QoS (quality of service) by adding new link metrics such as a residual bandwidth and a delay to a border gateway protocol (BGP) to control routing between autonomous system (AS) domains so as to optimize these link metrics.

The link metrics are assigned to roughly two kinds of links, a link between AS and a link for relaying within an AS. As to a link between AS, parameters can be extracted from a residual bandwidth, a delay and the like of a physical link. As to information about a link between AS, path information is exchanged by an external BGP (E-BGP) session set between border routers of the AS.

On the other hand, in a case of a link relaying within an AS, parameters such as a residual bandwidth and a delay should be assigned to a logical link passing through a plurality of routers and a plurality of links existing in the AS. As to information about a logical link of relays in the AS, path information is exchanged by an internal BGP (I-BGP) session set up between AS border routers in the AS. The path of the I-BGP session will form a path of a logical link, and residual bandwidth and delay values on the path should be obtained and reflected on metrics of the logical link.

For this purpose, by extending an intradomain gateway protocol (IGP), for example, Open Shortest Path First (OSPF) or Integrated Intermediate System Intermediate System (integrated IS-IS) to employ a system (IGP-TE system) of exchanging parameters such as a residual bandwidth and a delay for a physical link, values of a residual bandwidth, a delay and the like on a path of the logical link can be obtained and notified to the I-BGP.

By the foregoing procedure, such metrics as a residual bandwidth and a delay can be added to each path of an E-BGP session between AS and an I-BGP session passing within an AS.

At the path selection from a terminal or a router in an AS-A to a terminal or a router in other AS-B in consideration of a residual bandwidth and a delay using both of the above-described conventional BGP-TE system and IGP-TE system, such path selection as follows is conducted. AS border router candidates which can be routed from a terminal or a router in the AS-A to the AS-B are extracted from IGP-TE information.

In a case where the OSPF is used as an IGP, for example, distribution of address reachability from an AS border router in the AS-A to an external AS by using an AS external LSA leads to recognition. In general, however, only with IGP-TE information, address reachability from an AS border router to an external AS can be recognized, while resource information can not be found about how much bandwidth, delay or the like is required to reach a certain external AS.

Here, as proposed in the BGP-TE system, when a terminal or a router in the AS-A operates the IGP-TE protocol, in particular, and an I-BGP session is set between the terminal or router and an AS border router in the AS-A to enable reception of BGP-TE protocol information, since a candidate for a path from an AS border router candidate in the AS-A to the AS-B can be extracted from the BGP-TE information, selection of an optimum path to reach from a terminal or a router in the AS-A to the AS-B through a border router in the AS-A taking a residual bandwidth and a delay into consideration is enabled by conducting path calculation together with IGP-TE information.

Although this path selection is possible from a terminal or a router in the AS-A to an AS border router in the AS-B, path selection from an AS border router in the AS-B as a final AS to a destination terminal or router in the AS-B is impossible. Further problem is that selection of an optimum AS border router to reach a destination terminal or a router in the AS-B in consideration of a result of the path selection in the AS-B is impossible.

In this problem, there might be a case where even when path selection, for example, from a terminal or a router in the AS-A to an AS border router in the AS-B is optimum, the path selection may result in being not optimum in the end-to-end view because a path from an AS border router in the AS-B to a destination terminal or router in the AS-B congests and there remains only a path having few residual bandwidths and a large delay. Conventional techniques therefore have the problem that when interdomain QoS routing is conducted, optimum path selection covering the entire path (end-to-end) is impossible.

Another example of a conventional interdomain routing system (not an interdomain QoS routing system) will be described as a related and similar technique. One example of a device of this kind is recited in the technical explanatory by K. Delgadillo, entitled "Cisco Distributed Director" on pages 1 through 19 of the white paper issued by Cisco Systems Inc. in 1999.

The technique disclosed in the explanatory is proposed as a Web load distribution system in which when a Web client accesses a Web server, on the assumption that a plurality of Web mirror servers exist in a network, a path is selected which employs a Web server of a low processing load and as short a path of a network as possible. Under Web environments, conducted is transaction processing in which an HTTP get request is made by the Web client side to a server and the Web server returns an HTTP response to the Web client side.

Since the amount of transferred information of an HTTP response is large in general, at the path selection, an optimum path from a Web server directed toward a Web client largely affects the performance. In other words, when a plurality of Web mirror servers exist, it is necessary to determine in total from which mirror server a path to the Web client is the shortest or which Web mirror server has a low processing load of its own.

In order to satisfy the above-described requirement, the present technique proposes a direct response protocol (DRP) by which a DRP agent of a Web client site can collect, for a DRP server existing in a plurality of Web mirror server sites, all of the shortest paths directed toward the Web client from the respective mirror servers and processing loads of the Web mirror servers, so that an optimum Web mirror server can be selected based on the collection result. Network assumed at this time is an interdomain network, in which a shortest path from a Web mirror server directed toward a Web client is obtained by acquiring information about both the number of hops of AS at the BGP (border gateway protocol) level and the number of hops of routers at the IGP (intradomain gateway protocol) level.

In other words, characteristic points are two, one is that a shortest path in interdomain routing is obtained by using information of both the BGP level and the IGP level and the other is that a system is adopted which takes a shortest path of a network in a reception direction into consideration in order to select a Web server with which a Web client is to communicate.

The DRP protocol, as well as the above-described BGP-TE, however, is not allowed to make end-to-end optimum path selection because selection of an optimum AS border router in the final stage AS and selection of a path from an AS border router to a Web client are not taken into consideration.

The above-described conventional interdomain routing has several problems. More specifically, the first problem is that path selection in an interdomain network is impossible which is conducted taking network resources such as a bandwidth and a delay into consideration end to end. The reason is that when only the conventional BGP-TE system and the IGP-TE system are used, while path selection in an AS on the transmission side and selection of a path from the transmission side AS to a destination AS can be conducted using network resources, selection of an optimum AS border router in the destination AS and selection of an optimum path from a selected AS border router to a destination terminal or router are impossible.

Second problem is that when path selection is conducted taking network resources such as a bandwidth and a delay into consideration end to end, an optimum path in a reception direction can not be selected. The reason when a DRP is used is that while a path in the reception direction can be returned, no optimization is made because path information of a transmission domain is not used in combination. The reason when only a BGP-TE and a IGP-TE are used is that because the BGP-TE, in particular, has information about a path only in the transmission direction, the selection of an optimum path only in the transmission direction is possible even using both the TE.

Third problem is that path selection is impossible that simultaneously satisfies an optimum server and an optimum network path therefor in consideration not only of QoS parameters such as a residual bandwidth and a delay of a network path but also of a load of a server. The reason is that no function is provided for notifying all of server load information, network path candidate information and QoS metric information.

SUMMARY OF THE INVENTION

The present invention is intended to solve the above-described shortcomings and its object is to provide a device enabling path selection in an interdomain network taking network resources such as a bandwidth and a delay into consideration end to end and, more particularly, to an interdomain routing system enabling selection of an optimum AS border router in a destination AS and selection of an optimum path from a selected AS border router to a destination terminal or router.

Another object of the present invention is to provide a device enabling selection of an optimum path taking network resources such as a bandwidth and a delay into consideration end to end not only in a transmission direction but also in a reception direction.

A further object of the present invention is to provide a device enabling path selection which simultaneously satisfies an optimum server and an optimum network path therefor taking not only QoS parameters such as a residual bandwidth and a delay of a path in a network but also a load of a server into consideration.

According to the first aspect of the invention, An interdomain routing system wherein a node, comprising:

own intradomain path selection means for selecting a path by exchanging information about a path in the own domain;

interdomain path selection means for receiving information about a path between domains to select a path;

destination domain reception path candidate obtaining means for requesting a destination node for obtaining a group of candidate paths from the node in question toward the destination node; and end-to-end path selection means;

wherein the end-to-end path selection means selecting an optimum path end to end based on paths in the domain of the node in question, interdomain paths from the domain in question to the destination domain and paths in the domain of the destination node.

In the preferred construction, the own intradomain path selection means includes means for exchanging topology of a network in a domain and link resource information such as a bandwidth metric and a QoS metric of a link.

In another preferred construction, the interdomain path selection means includes means for exchanging topology of a network between domains and link resource information such as a bandwidth metric and a QoS metric of a link.

In another preferred construction, the own intradomain path selection means includes means for exchanging topology of a network in a domain and link resource information such as a bandwidth metric and a QoS metric of a link, and the interdomain path selection means includes means for exchanging topology of a network between domains and link resource information such as a bandwidth metric and a QoS metric of a link.

In another preferred construction, the interdomain path selection means is provided at an external node other than a transmission node or a destination node, so that the transmission node or the destination node obtains path information by inquiring of the interdomain path selection means existing in the other external node.

In another preferred construction, the interdomain routing system, wherein as a transmission node, an arbitrary node for relay is selected as a transmission proxy node and as a destination node, an arbitrary node for relay is selected as a destination proxy node.

According to the second aspect of the invention, An interdomain routing system wherein a node, comprising:

own intradomain path selection means for selecting a path by exchanging information about a path in the own domain;

interdomain path selection means for receiving information about a path between domains to select a path; and domain reception path candidate reply means responsive to a request from a transmission node for returning, as a reply, a group of candidate paths from the transmission node toward the node in question.

In the preferred construction, the own intradomain path selection means includes means for exchanging topology of a network in a domain and link resource information such as a bandwidth metric and a QoS metric of a link.

In another preferred construction, the interdomain path selection means includes means for exchanging topology of a network between domains and link resource information such as a bandwidth metric and a QoS metric of a link.

In another preferred construction, the own intradomain path selection means includes means for exchanging topology of a network in a domain and link resource information such as a bandwidth metric and a QoS metric of a link, and the interdomain path selection means includes means for exchanging topology of a network between domains and link resource information such as a bandwidth metric and a QoS metric of a link.

In another preferred construction, the interdomain path selection means is provided at an external node other than a transmission node or a destination node, so that the transmission node or the destination node obtains path information by inquiring of the interdomain path selection means existing in the other external node.

In another preferred construction, the interdomain routing system, wherein as a transmission node, an arbitrary node for relay is selected as a transmission proxy node and as a destination node, an arbitrary node for relay is selected as a destination proxy node.

According to the third aspect of the invention, An interdomain routing system having a transmission node and a destination node, wherein the transmission node including own intradomain path selection means for selecting a path by exchanging information about a path in the own domain, interdomain path selection means for receiving information about a path between domains to select a path, destination domain reception path candidate obtaining means for requesting a destination node for obtaining a group of candidate paths from the transmission node toward the destination node, and end-to-end path selection means for selecting an optimum path end to end based on paths in the domain of the transmission node, interdomain paths from the transmission domain to the destination domain and paths in the domain of the destination node, and the destination node including own intradomain path selection means for selecting a path by exchanging information about a path in a domain, interdomain path selection means for receiving information about a path between domains to select a path, and destination domain reception path candidate reply means responsive to a request from the transmission node for returning, as a reply, a group of candidate paths from the transmission node toward the destination node.

In another preferred construction, the own intradomain path selection means includes means for exchanging topology of a network in a domain and link resource information such as a bandwidth metric and a QoS metric of a link.

In another preferred construction, the interdomain path selection means includes means for exchanging topology of a network between domains and link resource information such as a bandwidth metric and a QoS metric of a link.

In another preferred construction, the own intradomain path selection means includes means for exchanging topology of a network in a domain and link resource information such as a bandwidth metric and a QoS metric of a link, and the interdomain path selection means includes means for exchanging topology of a network between domains and link resource information such as a bandwidth metric and a QoS metric of a link.

In another preferred construction, the interdomain path selection means is provided at an external node other than a transmission node or a destination node, so that the transmission node or the destination node obtains path information by inquiring of the interdomain path selection means existing in the other external node.

In another preferred construction, the interdomain routing system, wherein as a transmission node, an arbitrary node for relay is selected as a transmission proxy node and as a destination node, an arbitrary node for relay is selected as a destination proxy node.

According to the fourth aspect of the invention, An interdomain routing system having a node, wherein the node comprising own intradomain path selection means for selecting a path by exchanging information about a path in the own domain, interdomain path selection means for receiving information about a path between domains to select a path, destination domain transmission path candidate obtaining means for requesting a destination node for obtaining a group of candidate paths from the destination node toward the node in question, and end-to-end path selection means, the end-to-end path selection means selecting an optimum path end to end based on paths in the domain of the destination node, interdomain paths from the destination domain to the domain in question and paths in the domain of the node in question.

In the preferred construction, the destination domain path candidate obtaining means has a function of obtaining, as a group of candidate paths from a destination node toward a transmission node, both of paths in the destination domain and interdomain paths from the destination domain to the transmission domain.

In another preferred construction, the own intradomain path selection means includes means for exchanging topology of a network in a domain and link resource information such as a bandwidth metric and a QoS metric of a link.

In another preferred construction, the interdomain path selection means includes means for exchanging topology of a network between domains and link resource information such as a bandwidth metric and a QoS metric of a link.

In another preferred construction, the intradomain path selection means includes means for exchanging topology of a network in a domain and link resource information such as a bandwidth metric and a QoS metric of a link, and the interdomain path selection means includes means for exchanging topology of a network between domains and link resource information such as a bandwidth metric and a QoS metric of a link.

In another preferred construction, the interdomain path selection means is provided at an external node other than a transmission node or a destination node, so that the transmission node or the destination node obtains path information by inquiring of the interdomain path selection means existing in the other external node.

In another preferred construction, the interdomain routing system, wherein as a transmission node, an arbitrary node for relay is selected as a transmission proxy node and as a destination node, an arbitrary node for relay is selected as a destination proxy node.

According to the fifth aspect of the invention, An interdomain routing system having a node, wherein the node comprising:

own intradomain path selection means for selecting a path by exchanging information about a path in the own domain, interdomain path selection means for receiving information about a path between domains to select a path, and domain transmission path candidate reply means responsive to a request from a transmission node for returning, as a reply, a group of candidate paths from the node in question toward the transmission node.

In the preferred construction, the destination domain path candidate obtaining means has a function of obtaining, as a group of candidate paths from a destination node toward a transmission node, both of paths in the destination domain and interdomain paths from the destination domain to the transmission domain.

In another preferred construction, the own intradomain path selection means includes means for exchanging topology of a network in a domain and link resource information such as a bandwidth metric and a QoS metric of a link.

In another preferred construction, the interdomain path selection means includes means for exchanging topology of a network between domains and link resource information such as a bandwidth metric and a QoS metric of a link.

In another preferred construction, the intradomain path selection means includes means for exchanging topology of a network in a domain and link resource information such as a bandwidth metric and a QoS metric of a link, and the interdomain path selection means includes means for exchanging topology of a network between domains and link resource information such as a bandwidth metric and a QoS metric of a link.

In another preferred construction, the interdomain path selection means is provided at an external node other than a transmission node or a destination node, so that the transmission node or the destination node obtains path information by inquiring of the interdomain path selection means existing in the other external node.

In another preferred construction, the interdomain routing system, wherein as a transmission node, an arbitrary node for relay is selected as a transmission proxy node and as a destination node, an arbitrary node for relay is selected as a destination proxy node.

According to the sixth aspect of the invention, An interdomain routing system having a transmission node and a destination node, wherein the transmission node including own intradomain path selection means for selecting a path by exchanging information about a path in the own domain, interdomain path selection means for receiving information about a path between domains to select a path, destination domain transmission path candidate obtaining means for requesting a destination node for obtaining a group of candidate paths from the destination node toward the transmission node, and end-to-end path selection means for selecting an optimum path end to end based on paths in the domain of the destination node, interdomain paths from the destination domain to the transmission domain and paths in the domain of the transmission node, and the destination node including own intradomain path selection means for selecting a path by exchanging information about a path in a domain, interdomain path selection means for receiving information about a path between domains to select a path, and destination domain transmission path candidate reply means responsive to a request from the transmission node for returning, as a reply, a group of candidate paths from the destination node toward the transmission node.

An interdomain routing system having a node, wherin the node comprising own intradomain path selection means for selecting a path by exchanging information about a path in the own domain, interdomain path selection means for receiving information about a path between domains to select a path, destination domain transmission path candidate obtaining means for inquiring of a plurality of destination node candidates about service object transfer to obtain a group of candidate paths from each of the destination node candidates toward the node in question and a processing load of a service node which conducts the service object processing in question, and service node path selection means for selecting an optimum service node and end-to-end path by making a comparison of end-to-end path costs based on a processing load of each service node, paths in the domain of the destination node, interdomain paths from the destination domain to the transmission domain and paths in the domain of the transmission node.

According to a further aspect of the invention, An interdomain routing system having a node, wherein the node comprising own intradomain path selection means for selecting a path by exchanging information about a path in the own domain, interdomain path selection means for receiving information about a path between domains to select a path, a service node load monitoring procedure for monitoring a processing load of a service node, and destination domain transmission path candidate reply means responsive to a request from a transmission node for returning a group of candidate paths from the node in question toward the transmission node and a service node load as a reply.

According to a still further aspect of the invention, An interdomain routing system having a transmission node and a destination node, wherein the transmission node including own intradomain path selection means for selecting a path by exchanging information about a path in the own domain, interdomain path selection means for receiving information about a path between domains to select a path, destination domain transmission path candidate obtaining means for inquiring of a plurality of destination node candidates about service object transfer to obtain a group of candidate paths from each of the destination node candidates toward the node in question and a processing load of a service node which conducts the service object processing in question, and service node path selection means for selecting an optimum service node and end-to-end path by making a comparison of end-to-end path costs based on a processing load of each service node, paths in the domain of the destination node, interdomain paths from the destination domain to the transmission domain and paths in the domain of the transmission node, and the destination node including own intradomain path selection means for selecting a path by exchanging information about a path in the own domain, interdomain path selection means for receiving information about a path between domains to select a path, a service node load monitoring procedure for monitoring a processing load of a service node, and destination domain transmission path candidate reply means responsive to a request from a transmission node for returning a group of candidate paths from the node in question toward the transmission node and a service node load as a reply.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
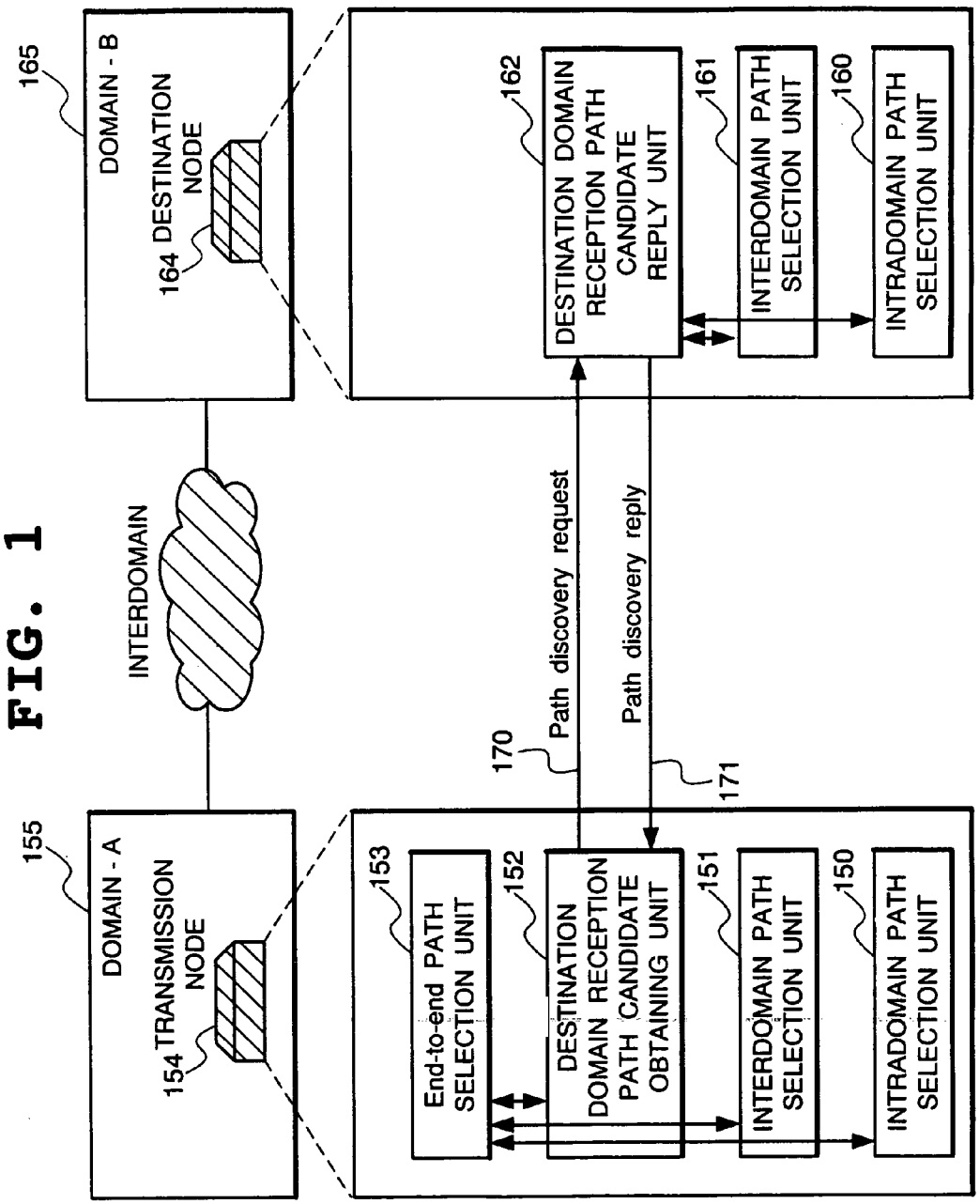
FIG. 1 is a block diagram showing a network structure to which an interdomain routing system according to a first embodiment of the present invention is applied.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

According to the present invention, an interdomain routing system (device) includes a destination domain reception path candidate obtaining means, a destination domain reception path candidate reply means and an end-to-end path selection means and operates such that optimum path selection can be conducted using all the information about paths within a transmission domain, paths from the transmission domain to a destination domain and paths within the destination domain. By adopting such an arrangement, as well as making intradomain routing and interdomain routing have the corresponding bandwidth metric and QoS metric, path selection taking network resources such as a bandwidth and a delay into consideration end to end can be realized which is an object of the present invention.

Furthermore, an interdomain routing system according to the present invention includes a destination domain transmission path candidate obtaining means, a destination domain transmission path candidate reply means and an end-to-end path selection means and operates such that selection of an optimum path in a reception direction can be conducted using all the information about paths within a destination domain, paths from a transmission domain to the destination domain and paths within the transmission domain. By adopting such an arrangement, as well as making intradomain routing and interdomain routing have the corresponding bandwidth metric and QoS metric, selection of an optimum path can be achieved taking network resources such as a bandwidth and a delay into consideration end to end not only in a transmission direction but also in a reception direction which is an object of the present invention.

Moreover, an interdomain routing system according to the present invention includes a destination domain transmission path candidate obtaining means, a destination domain transmission path candidate reply means and a service node path selection means and operates such that selection of an optimum path in a reception direction can be conducted using all the information about paths within a destination domain, paths from a transmission domain to the destination domain and paths within the transmission domain and also such that optimum network path selection can be conducted using a service node having a small load in consideration of these information and a load of a service node. By adopting such an arrangement, as well as making intradomain routing and interdomain routing have the corresponding bandwidth metric and QoS metric, path selection can be achieved which simultaneously satisfies an optimum server and an optimum network path therefor taking not only QoS parameters such as a residual bandwidth and a delay of a network path but also a load of a server into consideration which is an object of the present invention.

Figure 2:
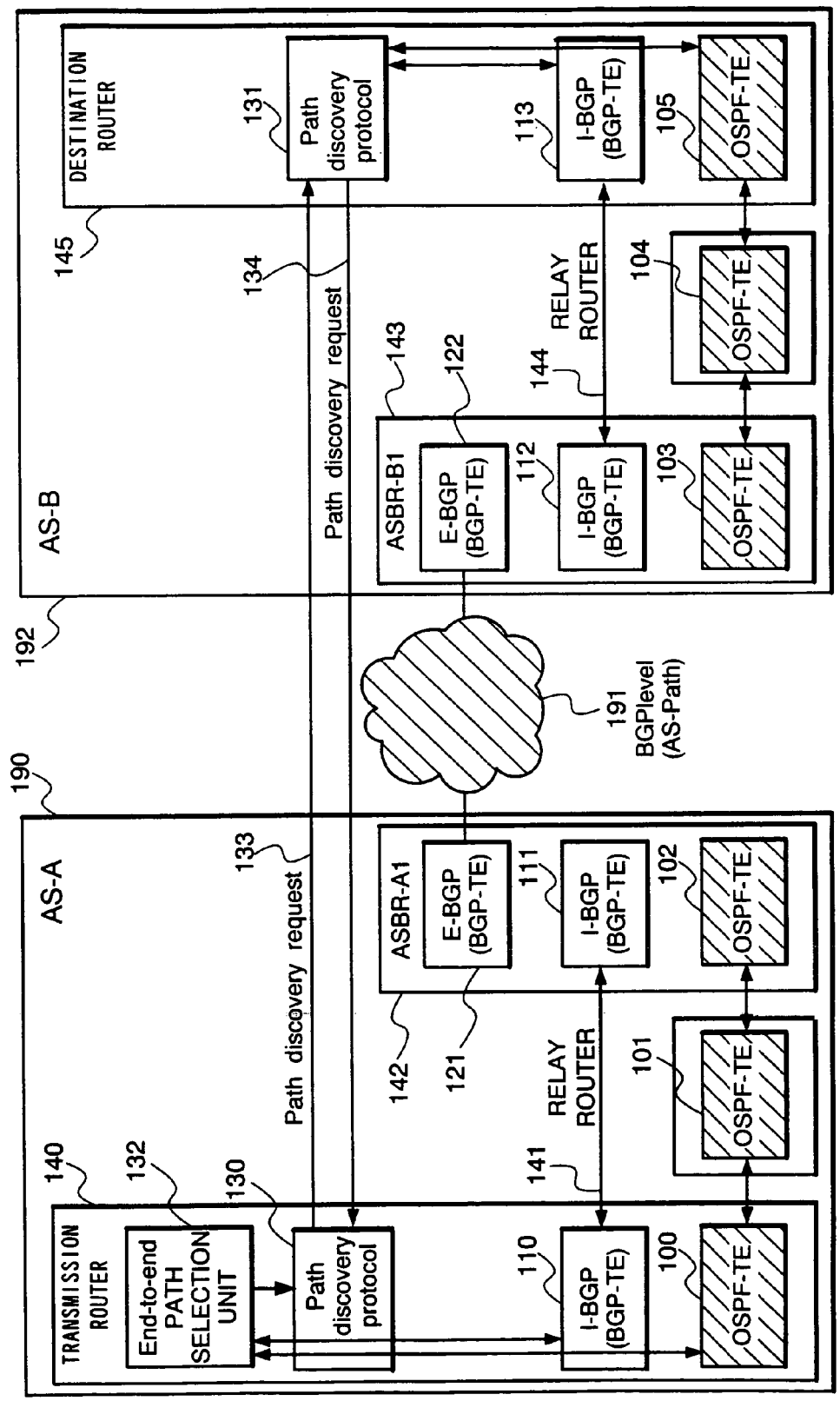
FIG. 2 is a block diagram showing a network structure according to the first embodiment of the present invention in detail.

In the following, embodiments of the present invention will be described in more detail with reference to the drawings. FIG. 1 is a block diagram showing a schematic structure of a first embodiment of the present invention and FIG. 2 is a block diagram showing the structure of the present embodiment in more detail. Referring to FIGS. 1 and 2 and giving a description of a corresponding relation between FIG. 1 and FIG. 2, the present embodiment will be described. The present embodiment corresponds to claims 1 to 17.

With reference to FIG. 1, the first embodiment is a network structure, under a condition that network domains, a domain A; 155 and a domain B; 165 are connected to each other by an interdomain, in which a transmission node 154 exists in the domain A; 155 and a destination node 164 exists in the domain B; 165, the transmission node 154 including an own intradomain path selection unit 150, an interdomain path selection unit 151, a destination domain reception path candidate obtaining unit 152 and an end-to-end path selection unit 153 and the destination node 164 including an own intradomain path selection unit 160, an interdomain path selection unit 161 and a destination domain reception path candidate reply unit 162.

The destination domain reception path candidate obtaining unit 152 transmits a path discovery request 170 to the destination node 164 and the destination domain reception path candidate reply unit 162 returns a result of a path candidate as a path discovery reply 171. By totaling partial path candidate information obtained by the own intradomain path selection unit 150, the interdomain path selection unit 151 and the destination domain reception path candidate obtaining unit 152, the end-to-end path selection unit 153 can obtain an optimum path considering all the paths within the transmission domain, interdomain paths from the transmission domain to the destination domain and paths within the destination domain.

For detailed description of operation of each unit shown in FIG. 1, FIG. 2 will be used. The block diagrams shown in FIGS. 2 and 1 have correspondence in a manner as described below. After describing correspondence of each unit, the embodiment will be described in the following with reference to FIG. 2.

Assuming that a domain in FIG. 2 is a management domain AS (autonomous system) where the Internet exists, corresponding relation will be described in the following with respect to a case where a node is set to correspond to a router. With reference to FIG. 2, in a network structure where both network domains, an autonomous system AS-A; 190 and AS-B; 192 are connected to an external network 191 by a BGP, exist in the AS-A; 190 are a transmission router 140, an intra-AS relay router 141 and an AS border router (ASBR) ASBR-A1; 142 and exist in the AS-B; 192 are a destination router 145, an intra-AS relay router 144 and an AS border router ASBR-B1; 143.

The domain A; 155 and the domain B; 165 in FIG. 1 correspond to the autonomous system AS-A; 190 and the autonomous system AS-B; 192, respectively, and the transmission node 154 and the destination node 164 correspond to the transmission router 140 and the destination router 145, respectively.

The above-described six kinds of routers in FIG. 2 are each composed of the following unit. First, the transmission router 140 in the AS-A employs an OSPF-TE unit 100 (or other routing information exchange procedure in the AS, for example, ISIS-TE procedure) as a dynamic routing information exchange procedure in the AS and employs an I-BGP unit 110 for obtaining BGP-TE information as a dynamic routing information obtaining procedure and includes a path discovery protocol unit 130 which is a unit for obtaining a path candidate in the destination domain and an end-to-end path selection unit 132 which is a unit for searching for an end-to end optimum interdomain path.

The relay router 141 in the AS-A has an OSPF-TE unit 101. The AS border router 142 has an OSPF-TE unit 102, an E-BGP unit 121 for exchanging interdomain dynamic routing information and an I-BGP unit 111 for notifying the information of the E-BGP unit 121 to other routers in the AS-A.

In the above-described arrangement, the OSPF-TE unit 100 corresponds to the own intradomain path selection unit 150, the I-BGP unit 110 to the interdomain path selection unit 151, the path discovery protocol 130 to the destination domain reception path candidate obtaining unit 152 and to the destination domain reception path candidate reply unit 162, and the end-to end path selection unit 132 corresponds to the end-to end path selection unit 153.

Then, the destination router 145 in the AS-B includes an OSPF-TE unit 105, an I-BGP unit 113 and a path discovery protocol unit 131 for searching for an optimum path between the own router and the transmission router in the AS-A.

The relay router 144 in the AS-B has an OSPF-TE unit 104. The AS border router 143 has an OSPF-TE unit 103, an I-BGP unit 112 and an E-BGP unit 122.

At this time, the OSPF-TE unit 105 corresponds to the own intradomain path selection unit 160, the I-BGP unit 113 to the interdomain path selection unit 161 and the path discovery protocol 131 to the destination domain reception path candidate reply unit 162. In addition, a path discovery request 133 corresponds to the path discovery request 170 and a path discovery reply 134 corresponds to the path discovery reply 171.

In brief, each of the above-described unit operates in a manner as described in the following. Description will be made appropriately with reference to FIGS. 3, 4 and 5.

In FIG. 2, the E-BGP unit 121 and 122 are connected to an external network by a BGP protocol, in particular, by E-BGP, to distributively exchange routing information using the path vector method. As a result, AS path information about how to go through AS to reach a destination IP address (or prefix of a destination IP address) can be obtained. AS path basically represents a path as linkage of ID of the AS.

Figure 3:
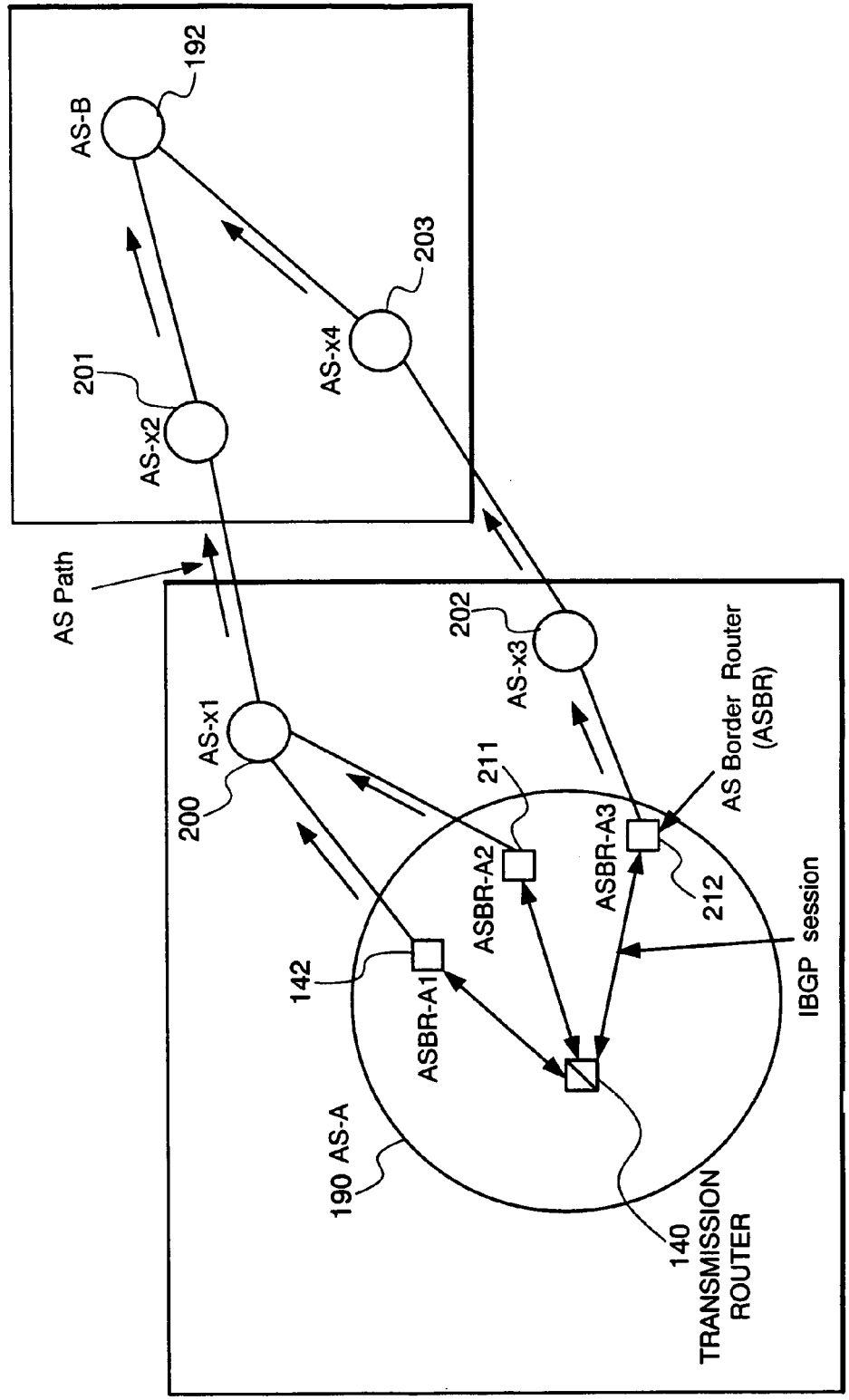
FIG. 3 is a block diagram showing network paths in the first embodiment of the present invention.

The block diagram of FIG. 3 which shows the network paths illustrates that two path candidates exist as a path from the AS-A190 to the reception router 145 in the AS-B in AS-B192, one sequentially passing through [AS-A (190), AS-x1 (200), AS-x2 (201), AS-B (192)] in this order and the other sequentially passing through [AS-A (190), AS-x3 (202), AS-x4 (203), AS-B (192)] in this order.

The E-BGP unit 121 on the AS border router 142 and the E-BGP unit on an AS border router 211 both obtain AS path information that [AS-A (190), AS-x1 (200), AS-x2 (201), AS-B (192)] out of the above-described two path candidates. On the other hand, an AS border router 212 obtains the AS path [AS-A (190), AS-x3 (202), AS-x4 (203), AS-B (192)] out of the above-described two path candidates.

The E-BGP unit 121 on the AS border router 142 notifies the AS path information [AS-A (190), AS-x1 (200), AS-x2 (201), AS-B (192)] for reaching the destination router 145 in the AS-B to the I-BGP unit 110 of the transmission router 140 by using the I-BGP unit 111. As shown in FIG. 3, the transmission router 140 obtains AS path information also from other AS border routers 211 and 212 through the I-BGP unit to obtain [AS-A (190), AS-x3 (202), AS-x4 (203), AS-B (192)] as a substitute AS path in addition to the above-described AS path.

By the foregoing procedure, the I-BGP unit of the transmission router 140 obtains all the BGP-level paths from the AS-A 190 to AS-B 192.

Conversely, the E-GBP unit 122 in the AS border router 143 obtains AS path information from the AS-B 192 to the AS-A 190 to notify the information to the I-BGP unit 113 in the destination router 145 through the I-BGP unit 112.

In FIG. 2, the OSPF-TE unit 100, 101 and 102 are allowed to find the entire topology and link information of the AS-A 190 by distributively exchanging topology of connectivity of routers in the AS-A 190 and QoS parameters such as a residual bandwidth and a delay of links between routers. Based on these information, the OSPF-TE unit 100, 101 and 102 can calculate an optimum path from an arbitrary router to an arbitrary router. In completely the same manner, the OSPF-TE unit 103, 104 and 105 are allowed to find the entire topology and link information in the AS-B.

Figure 4:
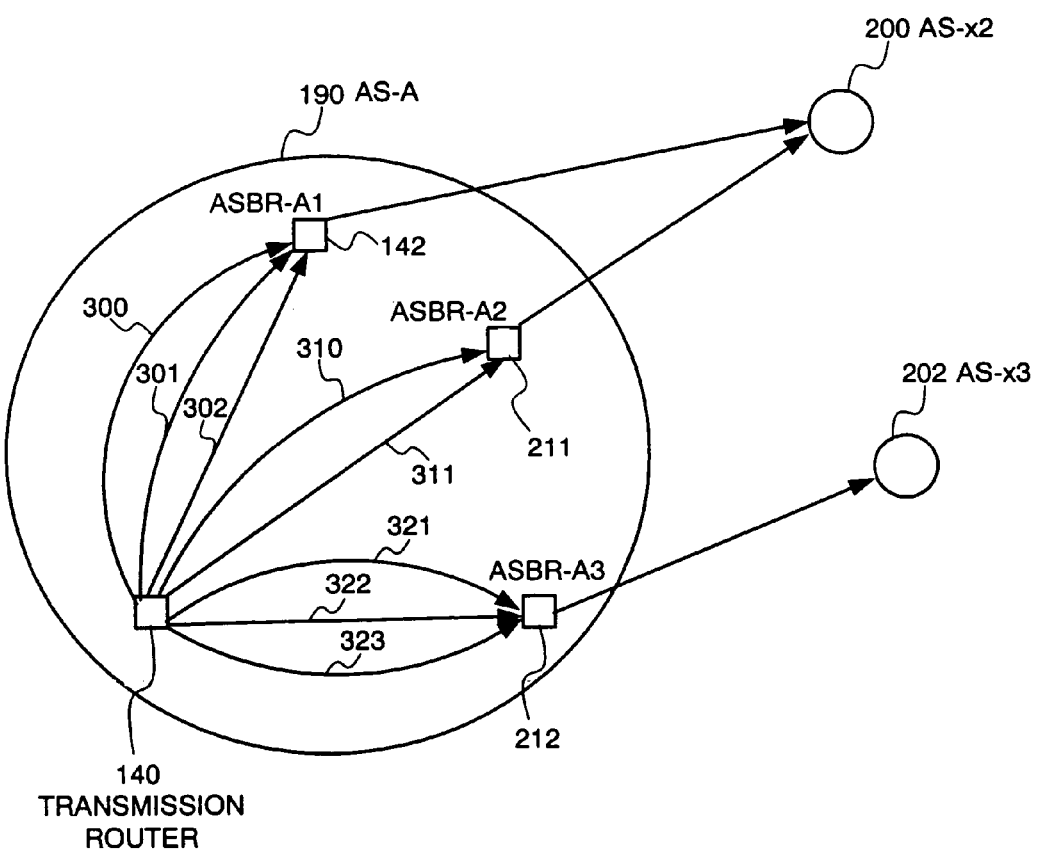
FIG. 4 is a block diagram showing network paths in the first embodiment of the present invention.

The block diagram of FIG. 4 which shows the network paths illustrates a state where for the AS border routers 142, 211 and 212 in the AS-A 190 which are reachable to a path from the transmission router 140 to the reception router 145 and which are passed through for reaching, candidate paths 300, 301, 302, 310, 311, 321 and 323 within the transmission domain are obtained by the OSPF-TE unit on the transmission router 140.

More specifically, by finding an interdomain path candidate AS path from the information of the I-BGP unit 110, extracting the AS borer routers 142, 211 and 212 to be passed through and further combining the information of the OSPF-TE unit 100, the transmission router 140 can obtain path candidates 300, 301, 302, 310, 311, 321, 323 in the information about candidates for a path from the transmission router to these AS border routers 142, 211, 212 and as a result, the candidates for a path from the transmission router 140 to the destination router 145 can be narrowed down to a group of candidates for paths between the AS-A and the AS-B taking a bandwidth and a delay into consideration.

Figure 5:
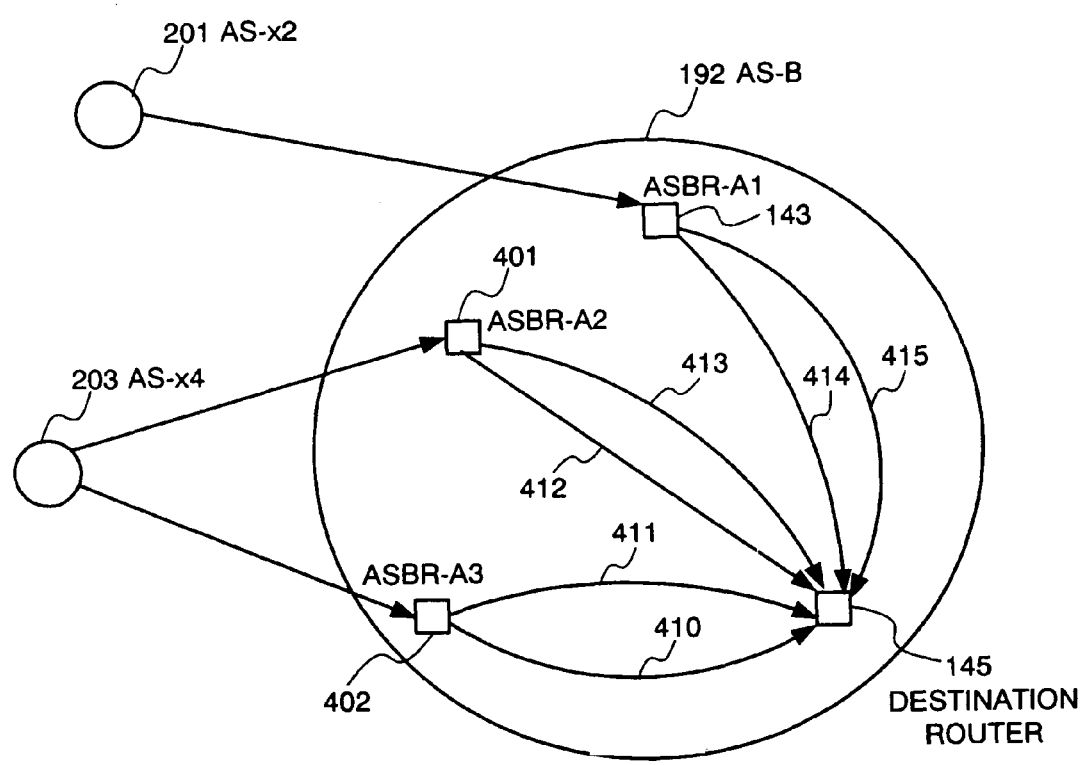
FIG. 5 is a block diagram showing network paths in the first embodiment of the present invention.

The path discovery protocol unit 130 in the transmission router 140 transmits the group of path candidates to the path discovery protocol unit 131 in the destination router 145 (the path discovery request message 133 in FIG. 2). The path discovery protocol unit 131 in the destination router 145 responsively selects AS border routers 143, 401 and 402 in the AS-B corresponding to the path candidate group with reference to the path information that the I-BGP unit 113 has (see the block diagram of FIG. 5 showing the network paths).

Next, obtain candidate paths 410, 411, 412, 413, 414 and 415 in the destination domain from the AS border routers 143, 401 and 402 to the destination router 145 with reference to the path information of the OSPF-TE unit 105 in the destination router 145. Then, select an optimum path taking a bandwidth and a delay into consideration from among the group of candidates for paths between the AS-A and the AS-B notified by the path discovery protocol unit 130 and the path candidate group in the AS-B.

The path discovery protocol unit 131 in the destination router 145 notifies information about both of the selected optimum path from the AS-A 190 to the AS-B 192 and optimum path from the AS border router in the AS-B to the destination router 145 to the path discovery protocol unit 130 of the transmission router 140 (the path discovery reply message 134 in FIG. 2).

Thus obtained results enable the transmission router 140 to make end-to-end path selection until the destination router 145 taking QoS such as a residual bandwidth and a delay into consideration. As a result of the present path selection, using, for example, the MPLS technique, enables data transfer by an arbitrary optimum path implicitly designated by the transmission router.

Next, with reference to FIG. 2 and the flow charts of FIGS. 6 and 7, entire operation of the present embodiment will be described in detail.

Figure 6:
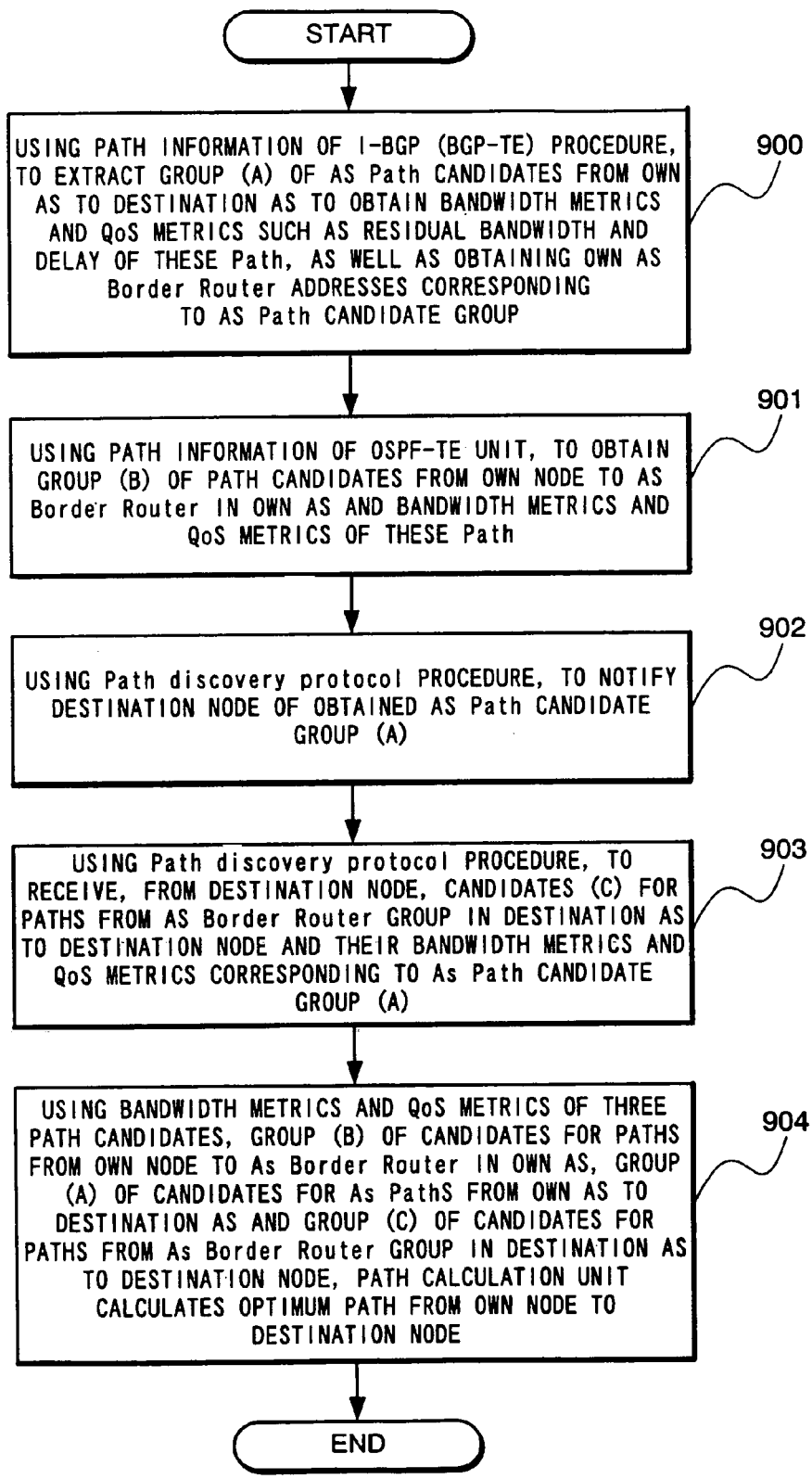
FIG. 6 is a flow chart for use in explaining operation in the first embodiment of the present invention.

The flow chart of FIG. 6 shows a path selection procedure at the transmission router 140. First, the I-BGP unit 110 in the transmission router 140 extracts a group (A) of candidates for an AS path from the AS 190 of the transmission domain to the AS 192 of the destination domain to obtain bandwidth metrics such as a residual bandwidth of these paths and QoS metrics such as a delay, as well as obtaining the AS border router addresses 142, 211 and 212 in the transmission AS corresponding to the AS path candidate group (900 of FIG. 6).

Next, using the path information of the OSPF-TE unit 100, obtain a group (B) of candidates for a path from the transmission router 140 to the AS border routers 142, 211 and 212 in the transmission AS 190 and bandwidth metrics, QoS metrics and the like of these paths (901 of FIG. 6).

The path discovery protocol unit 130 notifies the destination router 145 of the above obtained AS path candidate group (A) (902 of FIG. 6). In addition, the path discovery protocol unit 130 receives, from the destination router 145, candidates (C) for a path from the AS border router in the destination AS 192 to the destination router 145 and their bandwidth metrics and QoS metrics corresponding to the AS path candidate group (A) (903 of FIG. 6).

Lastly, using the bandwidth metrics and the QoS metrics of the three path candidates, the group (B) of candidates for a path from the transmission router 140 to the AS border router in the transmission AS, the group (A) of candidates for an AS path from the transmission AS to the destination AS and the group (C) of candidates for a path from the AS border router group in the destination AS 192 to the destination router 145, the end-to-end path selection unit 132 calculates an optimum path from the transmission router 140 to the destination router 145 (904 of FIG. 6).

Figure 7:
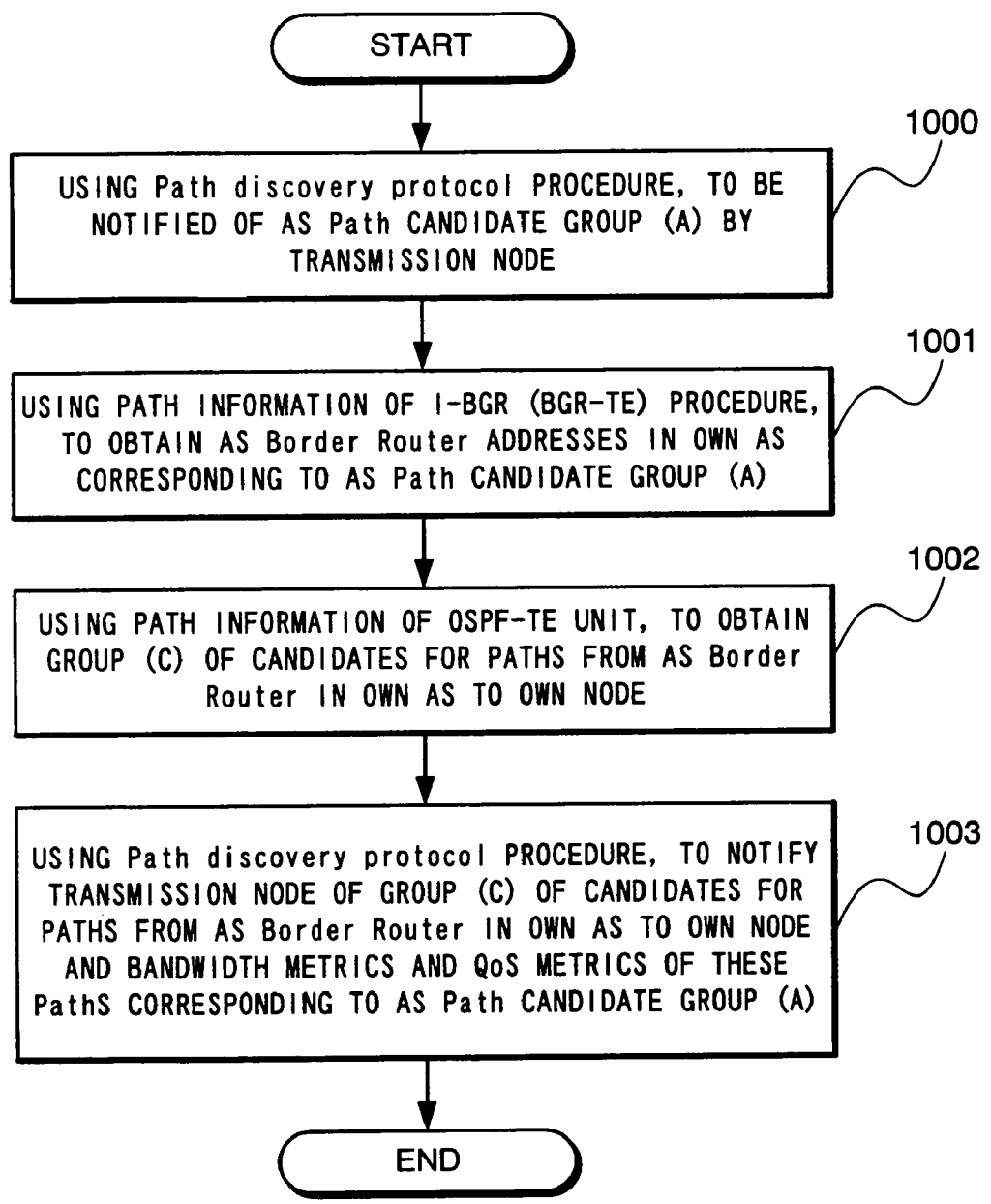
FIG. 7 is a flow chart for use in explaining operation in the first embodiment of the present invention.

On the other hand, the flow chart of FIG. 7 shows a path selection procedure at the destination router 145. The path discovery protocol unit 131 is notified of the AS path candidate group (A) by the transmission router 140 (1000 of FIG. 7). Using the path information of the I-BGP unit 113, obtain the AS border router addresses 143, 401 and 402 in the destination AS corresponding to the AS path candidate group (A) (1001 of FIG. 7). Subsequently, using the path information of the OSPF-TE unit 105, obtain the group (C) of candidates for a path from the AS border routers in the destination AS to the destination node (1002 of FIG. 7).

Lastly, the path discovery protocol unit 131 notifies the transmission router 140 of the group (C) of candidates for a path from the As border routers in the destination AS to the destination router 145 and the bandwidth metrics and the QoS metrics of these paths corresponding to the AS path candidate group (A) (1003 of FIG. 7).

Figure 8:
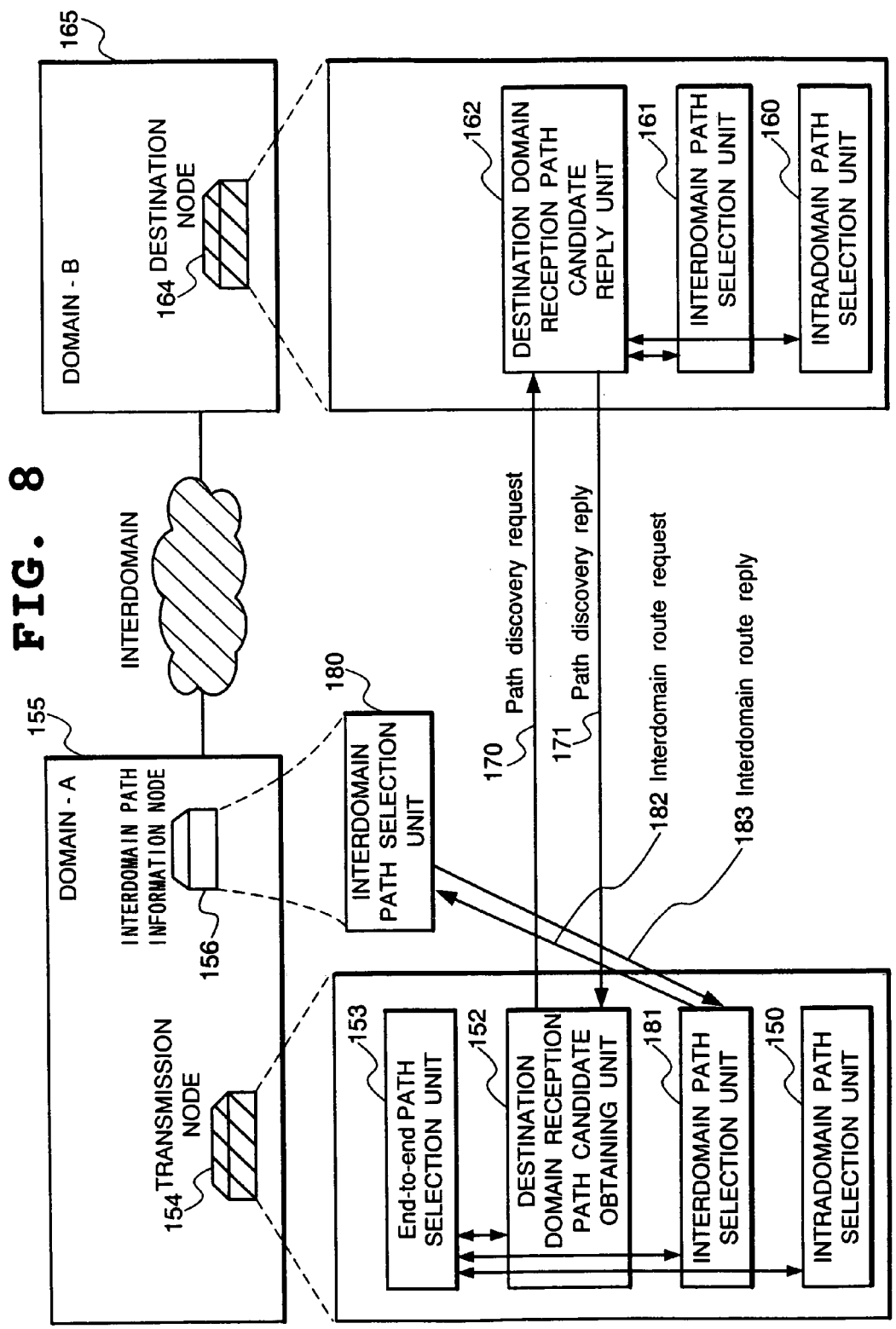
FIG. 8 is a block diagram showing a variation of the network structure according to the first embodiment of the present invention.
Figure 9:
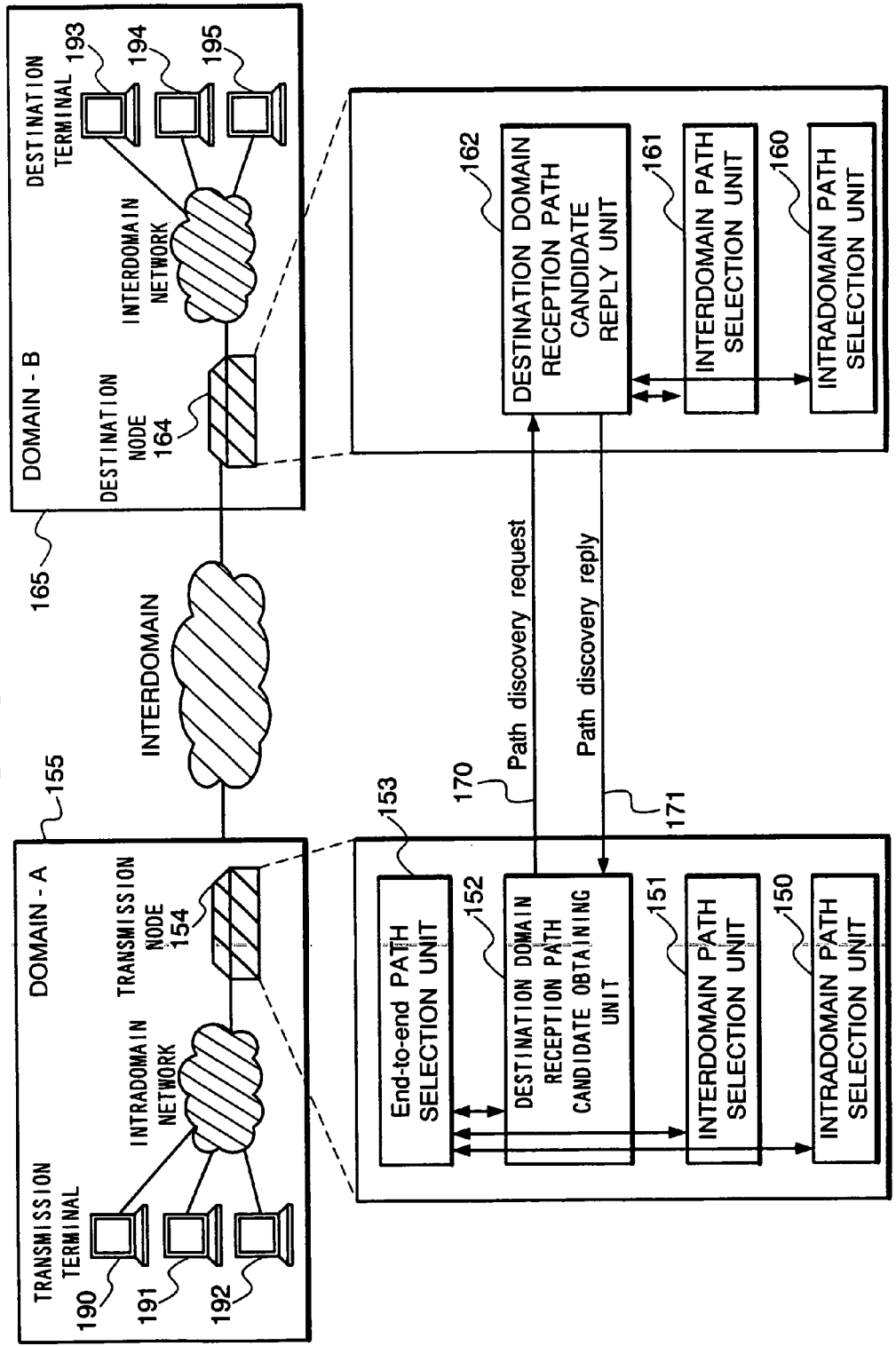
FIG. 9 is a block diagram showing another variation of the network structure according to the first embodiment of the present invention.

The above described first embodiment can adopt a mode in which a part of the functions in the transmission node is shifted to other node (FIG. 8). Another mode can be also adopted in which the transmission node and the destination node are used as proxy nodes of transmission and reception (FIG. 9). These modes will be described in the following. The mode shown in FIG. 8 corresponds to claims 7 and 16 and the mode shown in FIG. 9 corresponds to claims 8 and 17.

In the mode illustrated in the block diagram of FIG. 8 which shows the schematic structure, the function of the interdomain path selection unit 151 in the transmission node 154 in the mode of FIG. 1 is shifted to the position of an interdomain path selection unit 180 in a node 156 (here, an interdomain path information node) outside the transmission node. The transmission node 154 conducts communication with the interdomain path selection unit 180 in the node 156 to obtain information by unit of an interdomain path obtaining unit 181 in order to obtain interdomain path information and conduct path selection. The information is obtained as a pair of an interdomain route request 182 and an interdomain route reply 183. Operation of each mode other than the interdomain path selection unit is the same as that in the case of FIG. 2. The entire operation of the present embodiment also conforms to the operation in the case of FIG. 2 (see the flow charts of FIGS. 6 and 7).

The mode illustrated in the block diagram of FIG. 9 which shows the schematic structure is a model in which the transmission node 154 and the destination node 164 in the mode shown in FIG. 1 are connected to the transmission terminals 190, 191 and 192 and destination terminals 193, 194 and 195, respectively, through the networks in the respective domains and which shows that the transmission node 154 and the destination node 164 operate as proxies of the transmission terminal and the destination terminal.

Since for the communication with the destination terminals, the transmission terminals 190, 191 and 192 pass through the transmission node 154, path selection after passing through the transmission node 154 can realize the optimum path shown in FIGS. 1 and 2. At this time, as to the paths from the transmission terminals 190, 191 and 192 to the transmission node 154, path selection dependent only on path selection (OSPF-TE) in the domain is conducted.

On the other hand, since communication directed to the destination terminals 193, 194 and 195 passes through the destination node 164, path selection from the transmission node 154 to the destination node 164 can realize optimum path. Also from the destination node 164 to the destination terminals 193, 194 and 195, path selection is conducted dependently only on path selection (OSPF-TE) in the domain. Operation of each module other than the transmission node 154 and the destination node 164 is the same as that in the case of FIGS. 1 and 2, to which no description will be made here. In addition, the entire operation of the present embodiment conforms to the operation in the case of FIG. 2 (see flow charts of FIGS. 6 and 7).

[Effects]

Since the above described present embodiment is structured to extract path candidates in the destination AS in cooperation between the path discovery protocol unit 103 and 131, optimum path selection is possible taking a bandwidth metric and a QoS metric into consideration end to end.

Next, the second embodiment of the present invention will be described in detail with reference to the drawings. In the following, description of the second embodiment of the present invention will be made while referring to FIGS. 10, 11 and 12 and showing corresponding relation of each figure. The present embodiment corresponds to claims 18 through 25 and 28.

With reference to the block diagram of FIG. 10 which shows the schematic structure, the present embodiment is structured as described in the following. The structure is a network structure in which network domains, a domain A; 555 and a domain B; 565 are connected to each other through an interdomain and a transmission node 554 exists in the domain A 555 and a destination node 564 exists in the domain B 565.

Then, the transmission node 554 includes an own intradomain path selection unit 550, an interdomain path selection unit 551, a destination domain transmission path candidate reply unit 552 and a service node load monitoring unit 553. The address node 564 includes an own intradomain path selection unit 560, an interdomain path selection unit 561, a destination domain transmission path candidate obtaining unit 562 and a service node path selection unit 563. Under the herein defined destination node 564, a service client 567 is connected. Under the transmission node 554, a plurality of service nodes 558, 557 and 556 are connected to provide services in response to a request from the service client 567 connected to the destination node 564.

Possible example of a service node is a Web server and a possible example of a service client is a Web client. In a case of a Web server, for the transmission of Web contents in response to a request from the Web client, two nodes are here defined as a transmission node and a destination node, respectively, taking a transmission direction of the Web contents into consideration.

The destination domain transmission path candidate obtaining unit 562 transmits a path discovery request 670 to the transmission node 554 and the transmission domain transmission path candidate reply unit 552 makes a reply as the path discovery reply 171 including a result of path candidates and a load of the service node together. The service node path selection unit 563 is allowed to total partial path candidate information obtained by the own intradomain path selection unit 560, the interdomain path selection unit 561 and the destination domain transmission path candidate obtaining unit 562 to select an optimum path with a low service node load in view of all of the paths in the transmission domain, interdomain paths from the transmission domain to the destination domain and paths in the destination domain.

The schematic block diagram of FIG. 10 corresponds to each of the block diagrams of FIGS. 11 and 12 in the following manner. Description will be first made of corresponding relation of each unit and then made of the embodiment with reference to FIGS. 11 and 12.

In comparison with the above-described embodiment (see FIG. 2), the second embodiment is equivalent to a state where the transmission node 140 in the AS-A 190 operates as a dispatcher (e.g. a layer 7 switch of an HTTP in an IP packet for conducting path control on a URL basis) of a clustering server of a Web of the WWW and has a Web sub-tree server working under thereof which divisionally holds a plurality of Web mirror servers or directories of URL contents of a Web that are grouped on the basis of a prefix of a URL or the like, and where the destination node 145 in the AS-A 192 in FIG. 2 conducts operation for distributing loads of accesses from a Web client through a network.

Figure 11:
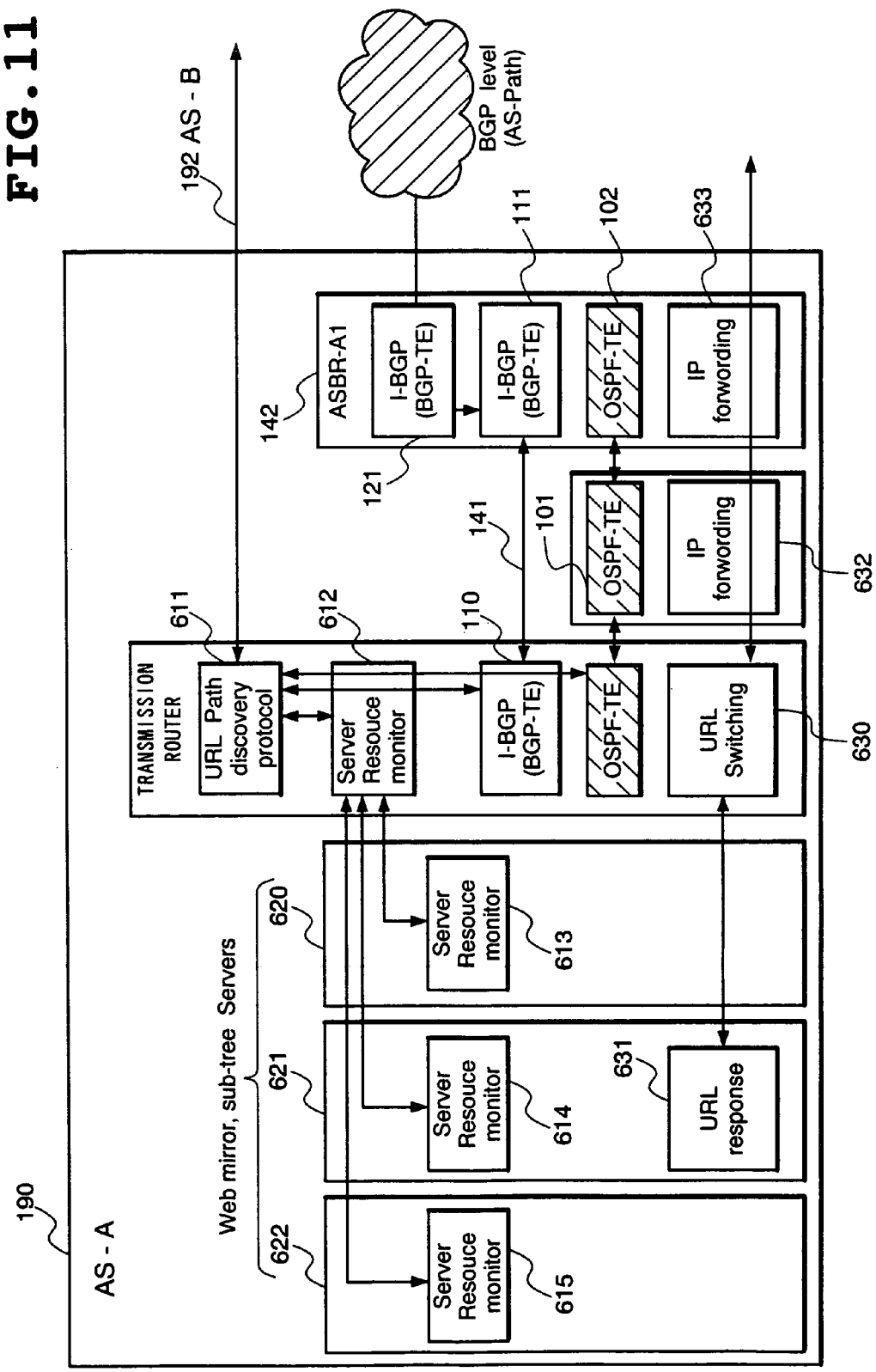
FIG. 11 is a block diagram showing details of the network structure according to the second embodiment of the present invention.

As shown in FIG. 11, the AS border router 142 and the relay router 141 in the AS-A 190 have the same functions as those in the already described case of FIG. 1. While the I-BGP procedure 110 and the OSPF-TE procedure 100 at a transmission router 601 have the same functions as those of the transmission router 140 shown in FIG. 2, a URL path discovery protocol procedure 611, a server resource monitor procedure 612 and a URL switching procedure 630 have different functions.

In addition, while the I-BGP procedure 113 and the OSPF-TE procedure 105 at a destination router 701 in the AS-B 192 have the same functions as those in the destination router 145 of FIG. 2, a URL path discovery protocol procedure 711 and a URL switching procedure 720 have different functions.

Here, the own intradomain path selection unit 550 and 560 correspond to the OSPF-TE unit 100 and 105, the interdomain path selection unit 551 and 561 to the I-BGP unit 110 and 113, the destination domain transmission path candidate reply unit 552 and the destination domain transmission path candidate obtaining unit 562 to the URL path discovery protocols 611 and 711, respectively, the service node load monitoring unit 553 to the server resource monitor 612, and the service node path selection unit 563 to a service node path selection unit 712.

In FIG. 11, by the server resource monitor procedure 612, the transmission router 601 periodically monitors such load information that each of Web mirror servers (sub-tree servers) 620, 621 and 622 has as a list of URL of Web contents, a CPU processing load and the number of TCP processed connections of a Web, and a free bandwidth that a Web server can use as a transmission bandwidth and a reception bandwidth (defined as a network load).

The URL list enables reduction of the amount of URL information by notifying only a prefix part of an URL. The information obtained by the server resource monitor procedure 612 allows addition of information which expresses resources of other servers and also allows selective monitoring of only the necessary resources.

The server resource monitor procedure 612 can obtain information also by periodically conducting polling with respect to server resource monitor procedures 613, 614 and 615 that the Web mirror servers 620, 621 and 622 have, while the server resource monitor procedures 613, 614 and 615 can execute registration procedures (at each event) with respect to the server resource monitor procedure 612 periodically, or when the URL list is changed, or when the CPU processing load exceeds a certain threshold value, or when a rate of change in a load exceeds a threshold value.

Figure 12:
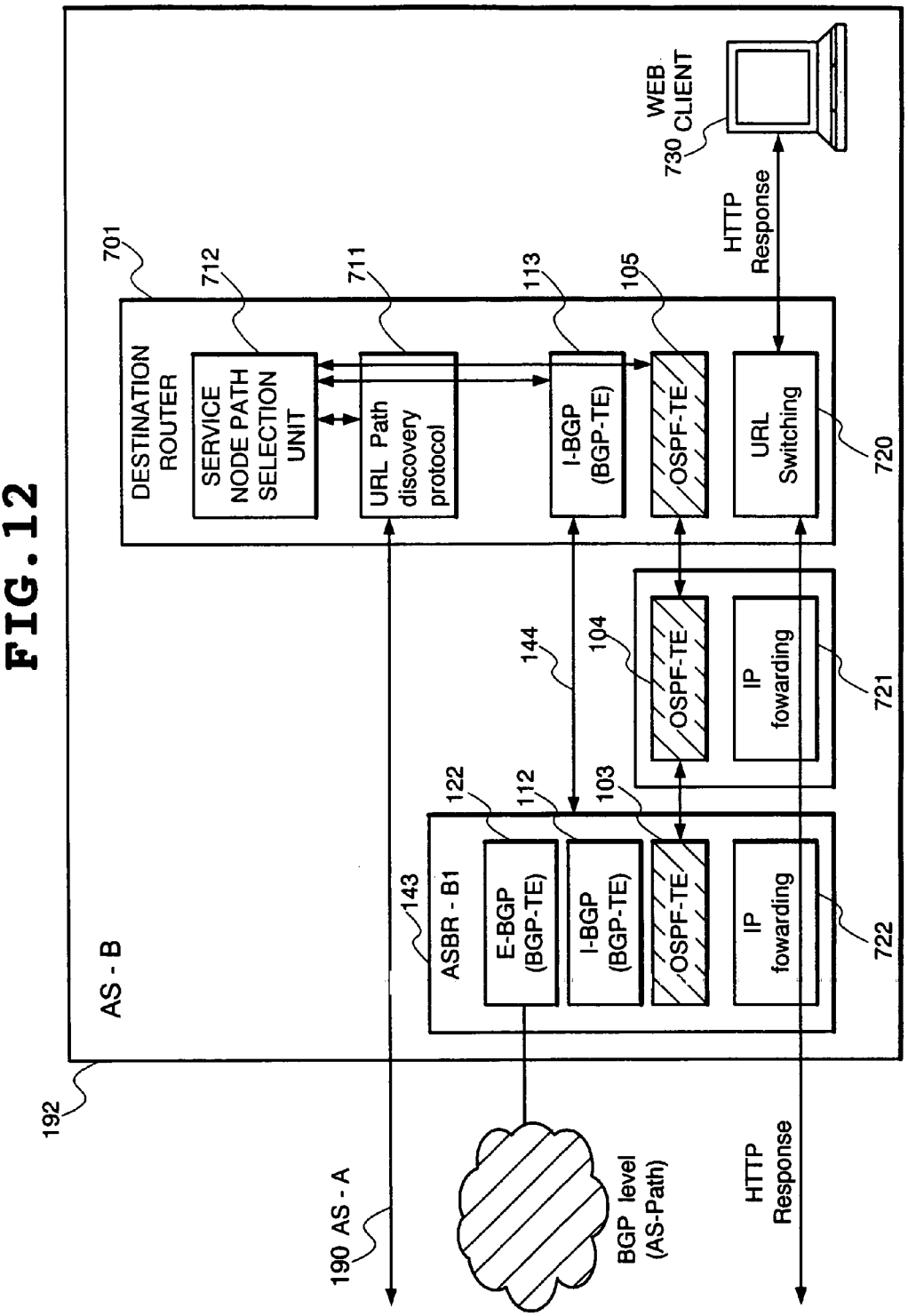
FIG. 12 is a block diagram showing details of the network structure according to the second embodiment of the present invention.

As shown in FIG. 12, under the destination router 701 in the AS-B 192, a Web client 730 exists. When the Web client 730 requires communication of a specific URL, the URL path discovery protocol procedure 711 and the URL switching procedure 720 in the destination router 701 will differ from conventional procedures. When an HTTP get request comes from the Web client 730, an HTTP session, that is, a TCP session is terminated to make a request for searching for an optimum Web server site using the URL path discovery protocol procedure 711 while watching an URL in a packet.

In the URL path discovery protocol procedure 711 in the destination router 701, upon receiving an HTTP packet, an URL is checked, and when Web mirror site or sub-tree server site information optimum for the URL is cached, the cache is used.

On the other hand, when the cache is mishit, the URL path discovery protocol procedure 711 transmits URL information to the URL path discovery protocol procedure 611 in the transmission router 601. The URL path discovery protocol procedure 611 selects a Web mirror or a sub-tree server whose load is low corresponding to the notified URL and searches paths from the transmission Web server site directed toward the Web client for a path whose network load is low and whose delay is short (satisfying QoS) and returns the results to the URL path discovery protocol procedure 711 in the destination router 701.

In this case, the result can be returned in either of the two manners: (1) returning only an IP address of the transmission router 601 of a Web mirror or a sub-tree server site and (2) notifying not only the IP address of the transmission router 601 of (1) but also an optimum path from the transmission router 601 to the destination router 701.

Figure 13:
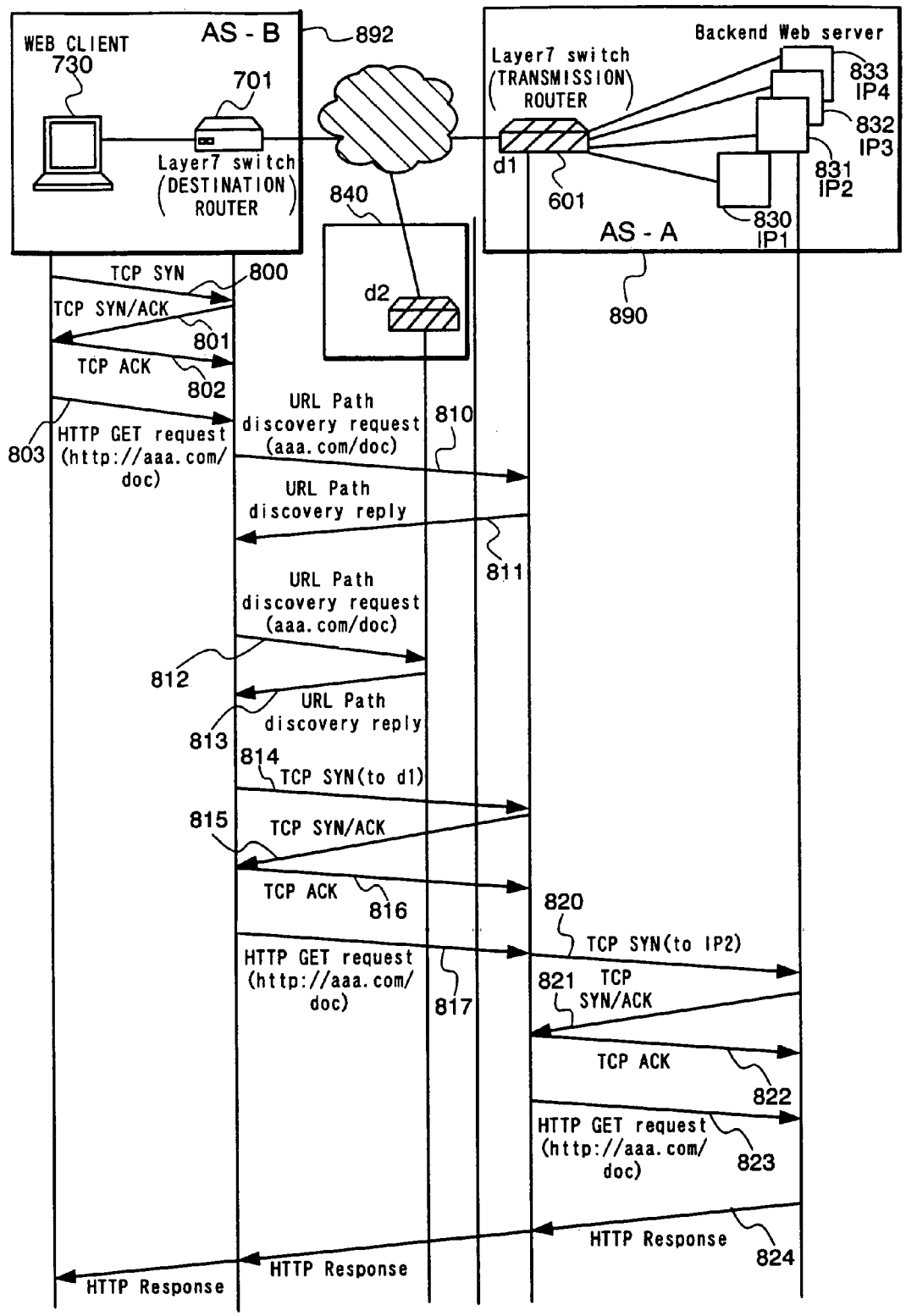
FIG. 13 is a diagram for use in explaining operation in the second embodiment of the present invention.

As illustrated in the diagram of FIG. 13 for use in explaining operation, the Web client 703 sets up a TCP session with the destination router 701 (layer 7 switch) in an AS-B 892 (procedures 800, 801 and 802) and thereafter, an HTTP get request is transferred (procedure 803). When the web server with the destination router 701 in the AS-B 892 as a dispatcher and corresponding to a URL in the HTTP get request have a plurality of sites holding the same contents, the transmission router 701 transmits URL path discovery request messages 810 and 812 to the plurality of sites d1 and d2 and receives URL path discovery reply messages 811 and 813 for these messages.

Taking all the returned results into consideration, the reception router determines which Web site selection is ultimately optimum and whether a path from the selected Web site toward the destination router is optimum or not. When optimum selection is made of a Web mirror site, a Web sub-tree server site or the like, the destination router 701 sets TCP sessions 814, 815 and 816 for the selected site and then an HTTP get request packet 817 is transferred.

In addition, the transmission router (layer 7 switch) 601 refers to the data of the server resource monitor 612 and refers to a CPU processing load, or the number of TCP connections, or/and a free bandwidth which can be used as a transmission bandwidth and a reception bandwidth of a Web server to select an optimum Web server from among backend Web servers 830, 831, 832 and 833. Here, the router selects the Web server 831 and after conducting TCP session setting 820, 821 and 822, an HTTP get request packet 823 is transferred.

Subsequently, with reference to the block diagrams of FIGS. 11 and 12 and the flow charts of FIGS. 14 and 15, the entire operation of the present embodiment will be described in detail.

Figure 14:
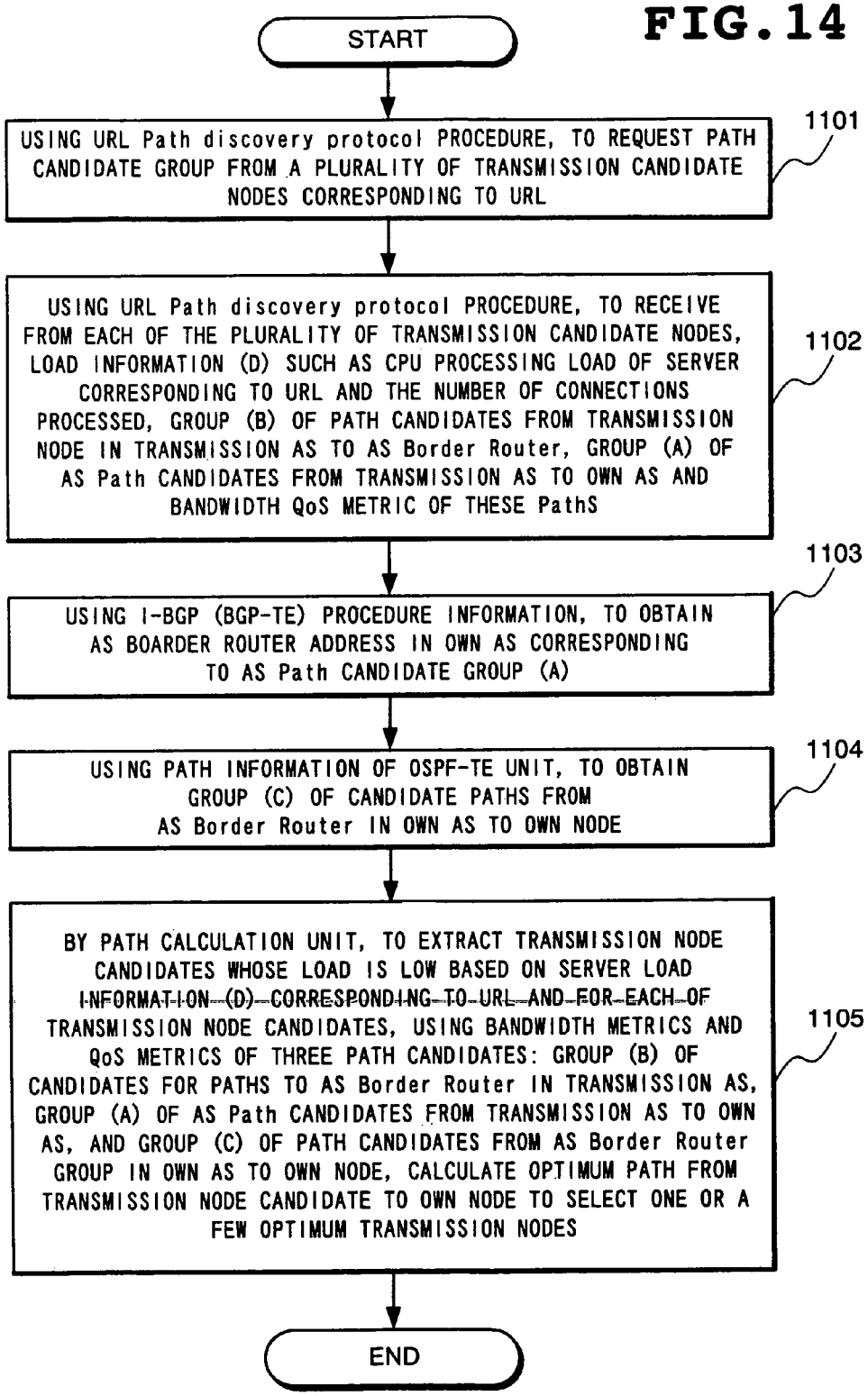
FIG. 14 is a flow chart for use in explaining operation in the second embodiment of the present invention.

First, the flow chart of FIG. 14 illustrates a path selection procedure at the destination router 701. The URL path discovery unit 711 in the destination router 701 requests a path candidate group from a plurality of Web server sites (a plurality of transmission nodes) corresponding to the URL (1101 of FIG. 14).

In addition, the URL path discovery procedure 711 receives a reply from each of the plurality of candidate nodes and receives, as its information, load information (D) such as a CPU processing load of a server corresponding the URL and the number of connections processed, a group (B) of path candidates from the transmission router in an AS-A 890 to the AS border routers, a group (A) of AS path candidates from the AS-A 890 to the AS-B 892 and bandwidth metrics and QoS metrics of these paths (1102 of FIG. 14).

The I-BGP unit 113 obtains AS boarder router addresses in the own AS corresponding to the AS path candidate group (A) (1103 of FIG. 14) and using the path information of the OSPF-TE unit 105, obtains a group (C) of candidate paths from the AS border routers in the own AS 892 to the own router 701 (1104 of FIG. 14).

By the service node path selection unit 712, extract transmission router candidates whose load is low based on the server load information (D) corresponding to the URL and for each of the transmission router candidates, using bandwidth metrics and QoS metrics of the three path candidates, the group (B) of candidates for paths from the transmission router in the transmission AS to the AS border routers, the group (A) of AS path candidates from the transmission AS to the own AS, and the group (C) of path candidates from the AS border router group in the own AS to the own router, calculate an optimum path from the transmission router candidates to the own router to select one or a few optimum transmission routers (1105 of FIG. 14).

The transmission router here selected is in other words a transmission router as a dispatcher for a Web server and therefore selecting an optimum transmission router is nothing more than selecting an optimum Web server.

Figure 15:
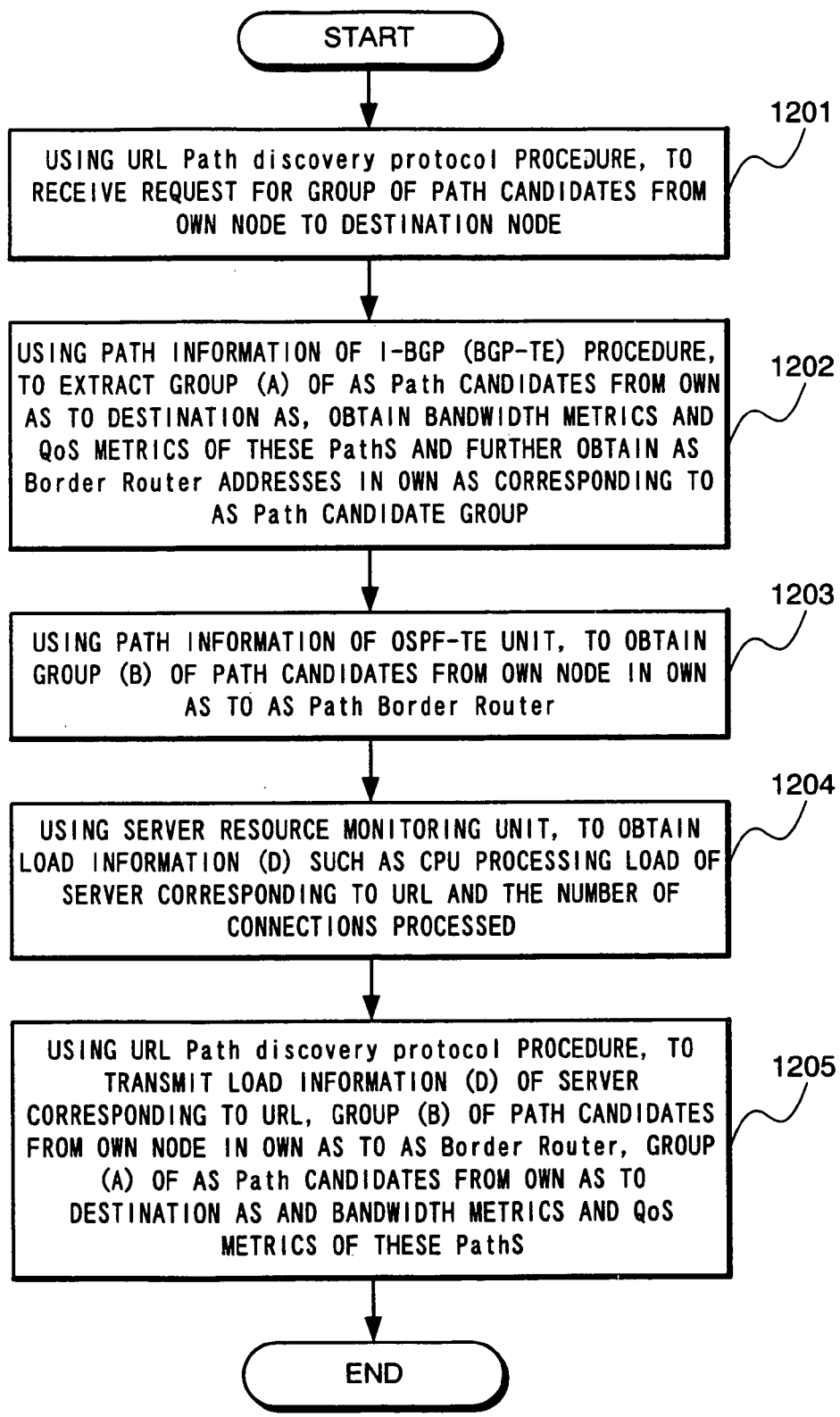
FIG. 15 is a flow chart for use in explaining operation in the second embodiment of the present invention.

The flow chart of FIG. 15 shows a path selection procedure at the transmission router 601. The URL path discovery protocol unit 612 receives a request for a group of path candidates from the own node to the destination node (1201 of FIG. 15). Using the path information of the I-BGP unit 110, extract the group (A) of AS path candidates from the own AS 190 to the destination AS 192, obtain bandwidth metrics and QoS metrics of these paths and further obtain AS border router addresses 142, 211 and 212 in the own AS corresponding to the AS path candidate group (1202 of FIG. 15).

Using the path information of the OSPF-TE unit 100, obtain the group (B) of path candidates from the own node to the AS border routers 142, 211 and 212 in the own AS (1203 of FIG. 15). Using the server resource monitoring unit 612, obtain load information (D) such as a CPU load of a server corresponding to the URL and the number of connections processed or a transmission bandwidth load of a Web server (1204 of FIG. 15).

Using the URL path discovery protocol unit, transmit the load information (D) of the server corresponding to the URL, the group (B) of path candidates from the own node in the own AS 190 to the AS border routers, the group (A) of AS path candidates from the own AS to the transmission AS and the bandwidth metrics and the QoS metrics of the paths (1205 of FIG. 15).

[Effects]

Since according to the present embodiment, the system is structured to select a transmission Web server having a low load in cooperation between the URL path discovery protocol unit 612 and 711 and to extract a path from a Web server site toward a transmission direction, the system enables path selection which simultaneously satisfies an optimum server and an optimum network path taking a bandwidth metric and a QoS metric into consideration end to end.

Next, a third embodiment of the present invention will be described in detail with reference to the drawings. The present embodiment corresponds to claims 26, 27 and 28. The third embodiment is composed of the elements shown in the block diagram of FIG. 16 which shows a schematic structure.

Figure 16:
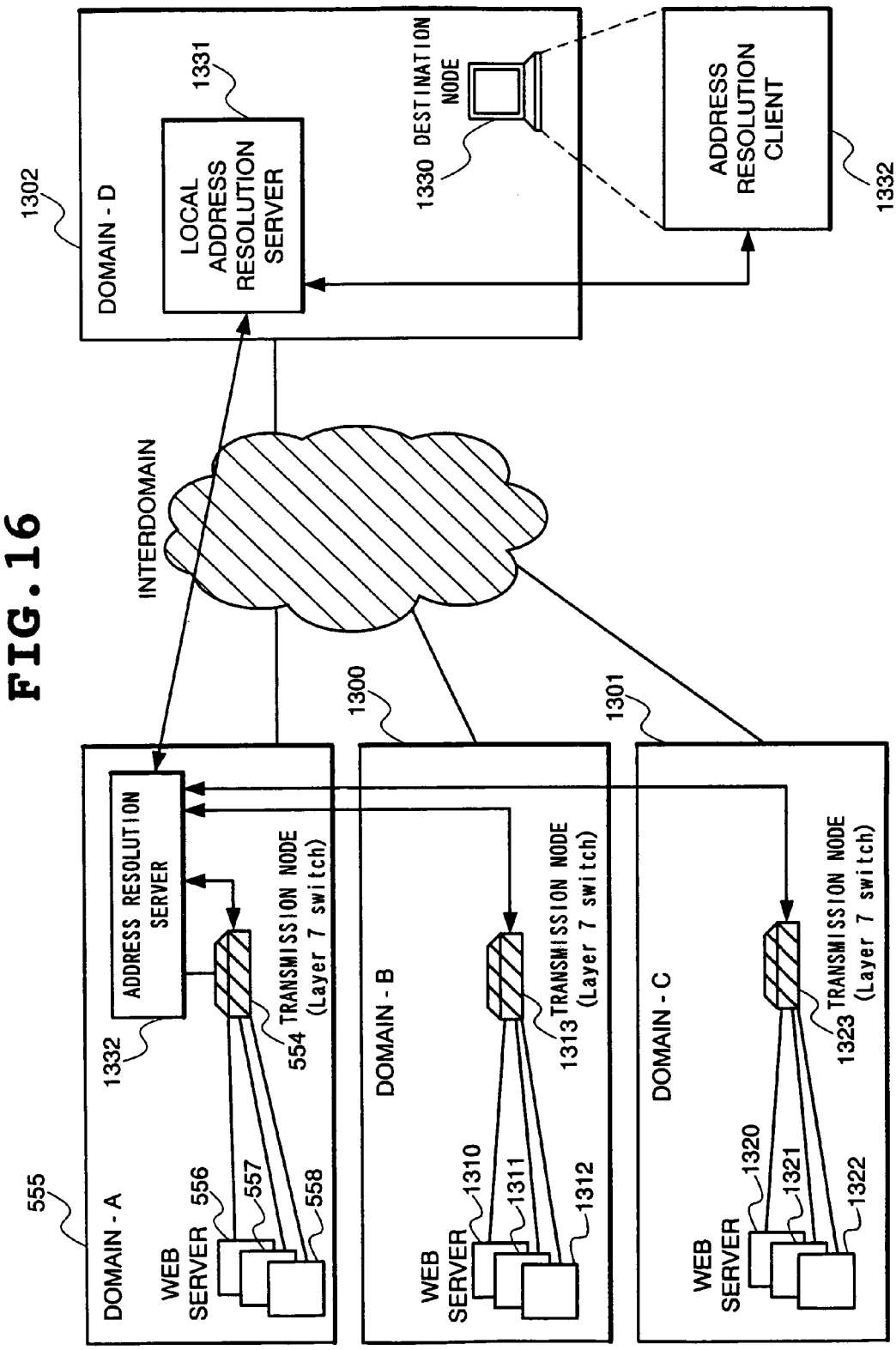
FIG. 16 is a block diagram showing a network structure according to a third embodiment of the present invention.

With reference to FIG. 16, a plurality of domains A555, B1300 and C1301 have Web servers 556, 557, 558, 1310, 1311, 1312, 1320, 1321 and 1322 each of which servers is assumed to have copy of the same Web contents (in the form of mirror) or a plurality of which servers are assumed to divisionally hold Web contents as directories (in the form of sub-tree).

Figure 10:
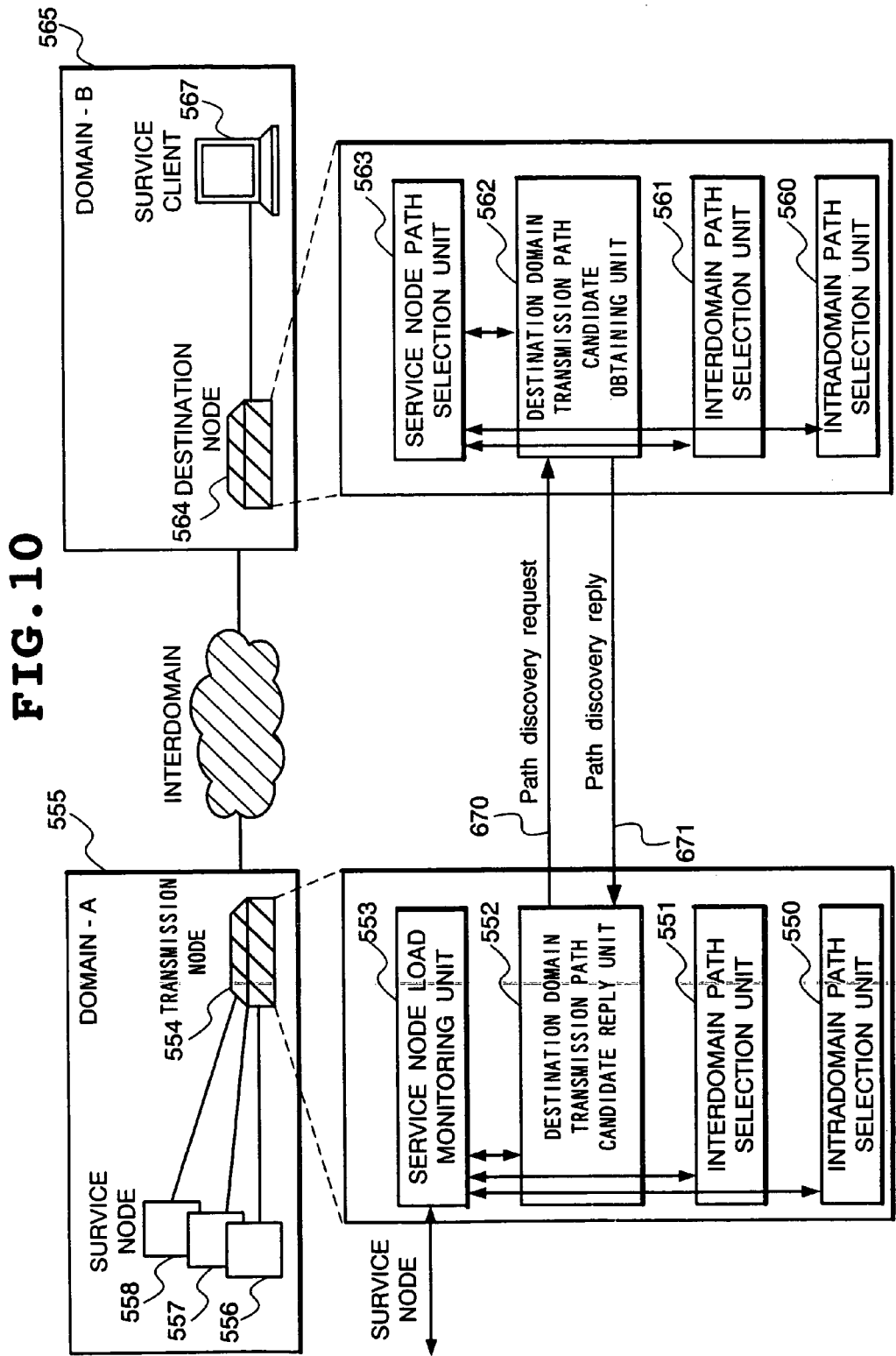
FIG. 10 is a block diagram showing a network structure to which an interdomain routing system according to a second embodiment of the present invention is applied.

In a domain D1302, none of such a destination node exists as the destination domains having high performance shown in FIGS. 2 and 10 but a destination node 1330 having a simple address resolution procedure such as a domain name system (DNS) exits. The node 1330 is assumed to have an address resolution client 1332 in the node.

In the domain 1032, a local address resolution server 1331 exists which in response to an address resolution request from the destination node 1330, transfers the request to the address resolution server 1332 which is the source of the address management.

The address resolution server 1332 returns any of addresses of transmission nodes (layer 7 switch) 554, 1313 and 1323 of the Web server sites in the domains A555, B1300 and C1301. For determining which address is to be returned, inquire of the transmission nodes 554, 1313 and 1323 to (1) conduct path calculation by means of the end-to-end path selection unit using path information of only the interdomain path selection unit and the own intradomain path selection unit, and (2) collect loads of the servers. As a result, the address resolution server selects an address of a transmission node having an optimum path and holding a Web server whose load is the lowest.

As a result of the address resolution, assuming, for example, that the return address is the transmission node 554, the destination node 1330 sets up a TCP session for the transmission node 554 to transmit an HTTP get request. With reference to the URL in the HTTP get request, the transmission node 554 selects a Web server having the corresponding URL contents and a low load among the Web servers 556, 557 and 558 working under the transmission node 554.

In addition, in FIG. 16, the Web client (destination node) 1330 once sets up a TCP session for the selected transmission node (layer 7 switch) 554.

While communication is underway, when a load of the Web server under the layer 7 switch 554 becomes high or when some failure occurs to degrade communication performance, the transmission node again asks the above-described address resolution server 1332 to search for a current optimum transmission node. Address of the optimum transmission node obtained as a result of the search is notified to the Web client 1330. Based on the notification, the Web client 1330 is allowed to set up a TCP session with the new layer 7 switch to resume communication with the optimum Web server.

Effects of the present embodiment will be described. Assuming that a destination node is a Web client or a Web proxy server, even when it has a single DNS address resolution function, load distribution function on a URL basis of a Web server site can be used in the present embodiment. The reason is that as a result of address resolution of the DNS, returning an address of a layer 7 switch (defined as a transmission node) on the side of a Web server site enables the URL-level load distribution function at the layer 7 switch to be used.

The first effect of the present invention is realizing path selection in an interdomain network taking network resources such as a bandwidth and a delay into consideration end to end. The reason is that using BGP-TE enables selection of candidates for a BGP level path from an own AS to a destination AS and using IGP-TE enables selection of candidates for a path from an own node in the own AS to AS border nodes and selection of candidates for a path from AS border routers in a destination AS to a destination terminal or router to obtain end-to-end path information, thereby enabling optimum path calculation based on the information.

The second effect is that optimum path selection is possible taking network resources such as a bandwidth and a delay end to end not only in a transmission direction but also in a reception direction. The reason is that since the function is provided of giving, to a transmission node, a notification of a group of candidate paths in a transmission direction seen from a destination node and a group of candidate paths in a reception direction seen from the destination node, path information in both directions can be optimized.

The third effect is that path selection is possible which simultaneously satisfies an optimum server and an optimum network path therefor taking not only QoS parameters such as a residual bandwidth and a delay of a network path but also a load of a server. The reason is that the function is provided which enables notification of all of server load information, network path candidate information and QoS metric information.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An interdomain routing system having a transmission node and a destination node, wherein
the transmission node includes:
intradomain path selection means for obtaining a group of candidate paths in a transmission domain by exchanging information about the path in the transmission domain, the intradomain path selection means including first means for exchanging topology of a network in the transmission domain;
interdomain path selection means for receiving information about a path between the transmission domain and at least one destination domain to obtain a group of candidate paths therebetween, the interdomain path selection means including second means for exchanging topology of a network between domains;

destination domain reception path candidate obtaining means for requesting a destination node for obtaining a group of candidate paths from the transmission node toward the destination node; and end-to-end path selection means, said end-to-end path selection means calculating an optimum path end to end based on bandwidth metrics and QoS metrics of three path candidates, the group of candidate paths in the transmission domain, the group of candidate paths between the transmission domain and the at least one destination domain, and the group of candidate paths from the transmission node toward the destination node.

2. The interdomain routing system as set forth in claim 1, wherein said first means exchanges topology of a network in the transmission domain and link resource information including at least one of a bandwidth metric and a QoS metric of a link.

3. The interdomain routing system as set forth in claim 1, wherein said second means exchanges topology of a network between domains and link resource information including at least one of a bandwidth metric and a QoS metric of a link.

4. The interdomain routing system as set forth in claim 1, wherein said first means exchanges topology of a network in the transmission domain and link resource information including at least one of a bandwidth metric and a QoS metric of a link, and said second means exchanges topology of a network between domains and link resource information including at least one of a bandwidth metric and a QoS metric of a link.

5. The interdomain routing system as set forth in claim 1, wherein said interdomain path selection means is provided at an external node other than a transmission node or a destination node, so that said transmission node or said destination node obtains path information by inquiring of the interdomain path selection means existing in the other external node.

6. The interdomain routing system as set forth in claim 1, wherein as a transmission node, an arbitrary node for relay is selected as a transmission proxy node and as a destination node; an arbitrary node for relay is selected as a destination proxy node.

* * * * *